US012799814B2

(12) United States Patent
Byeon

(10) Patent No.: US 12,799,814 B2
(45) Date of Patent: Nov. 17, 2026

(54) CONNECTING MEMBER HAVING HOOK MEMBER FOR VERTICAL BLIND, AND CURTAIN AND VERTICAL BLIND USING SAME

(71) Applicant: WINPLUS CO., LTD., Cheongju-si (KR)

(72) Inventor: Tae Woong Byeon, Daejeon (KR)

(73) Assignee: WINPLUS CO., LTD., Cheongju-si (KR)

(*) Notice: Subject to any disclaimer, the term of this patent is extended or adjusted under 35 U.S.C. 154(b) by 208 days.

(21) Appl. No.: 18/620,084

(22) Filed: Mar. 28, 2024

(65) Prior Publication Data

US 2024/0240517 A1 Jul. 18, 2024

Related U.S. Application Data

(63) Continuation of application No. PCT/KR2022/018221, filed on Nov. 17, 2022.

(30) Foreign Application Priority Data

Nov. 18, 2021 (KR) ........................ 10-2021-0159560
Nov. 15, 2022 (KR) ........................ 10-2022-0152956

(51) Int. Cl.
*E06B 9/36* (2006.01)

(52) U.S. Cl.
CPC .................................... *E06B 9/362* (2013.01)

(58) Field of Classification Search
CPC .... E06B 2009/2405; E06B 9/36; E06B 9/362; E06B 9/361; E06B 9/367; A47H 13/04; A47H 13/01
See application file for complete search history.

(56) References Cited

U.S. PATENT DOCUMENTS 635,295 A * 10/1899 Brown .................. A47H 13/04
D8/371
959,921 A * 5/1910 Clerk ..................... A47H 13/04
D8/371
1,528,111 A * 3/1925 Jensch .................. A47H 13/04
24/360
2,207,420 A * 7/1940 Thomas .................... E06B 9/36
160/133
2,422,407 A * 6/1947 Green ..................... E06B 9/362
160/172 R
2,604,159 A * 7/1952 Wright .................... E06B 9/367
160/DIG. 16

(Continued)

FOREIGN PATENT DOCUMENTS

AU 2021106850 A4 * 11/2021 ............. E06B 9/367
GB 2213518 A * 8/1989 ............. E06B 9/386

(Continued)

*Primary Examiner* — Johnnie A. Shablack
(74) *Attorney, Agent, or Firm* — Dinsmore & Shohl LLP; Yongsok Choi, Esq.

(57) ABSTRACT

Provided is a connecting member having a hook member for a vertical blind and a curtain and vertical blind using same. In particular, the connecting member includes attachment tools which are coupled to runners that are successively arranged in an inner space of a rail coupled to a ceiling; bodies arranged at the lower sides of the attachment tools; and hook members which are formed in hanger shapes and protrude from both side surfaces of the bodies.

11 Claims, 22 Drawing Sheets

(56) References Cited

U.S. PATENT DOCUMENTS

| | | | | | |
|---|---|---|---|---|---|
| 2,717,034 | A | * | 9/1955 | Sharpe | E06B 9/367<br>160/176.1 V |
| 2,822,043 | A | * | 2/1958 | Horak | E06B 9/367<br>160/172 R |
| 2,827,956 | A | * | 3/1958 | Achler | E06B 9/367<br>160/172 R |
| 2,844,199 | A | * | 7/1958 | Achler | E06B 9/365<br>160/176.1 V |
| 2,869,636 | A | * | 1/1959 | Klenz | E06B 9/362<br>160/168.1 V |
| 2,898,986 | A | * | 8/1959 | Kiefer | E06B 9/361<br>160/168.1 V |
| 2,932,351 | A | * | 4/1960 | Bried | E06B 9/367<br>160/176.1 V |
| 3,125,154 | A | * | 3/1964 | Woodle | E06B 9/367<br>160/178.1 V |
| 3,224,490 | A | * | 12/1965 | Toti | E06B 9/367<br>160/176.1 V |
| 3,298,425 | A | * | 1/1967 | Cayton | E06B 9/367<br>160/176.1 V |
| 3,299,943 | A | * | 1/1967 | Poe | E06B 9/368<br>160/176.1 V |
| 3,860,056 | A | * | 1/1975 | Bruneau | E06B 9/362<br>160/176.1 V |
| 4,006,769 | A | * | 2/1977 | Woodle | E06B 9/362<br>160/176.1 V |
| 4,102,381 | A | * | 7/1978 | Bratschi | E06B 9/36<br>160/176.1 V |
| 4,103,727 | A | * | 8/1978 | Spohr | E06B 9/362<br>160/168.1 V |
| 4,115,898 | A | * | 9/1978 | Frentzel | E06B 9/367<br>16/87 R |
| 4,116,257 | A | * | 9/1978 | Bratschi | E06B 9/364<br>160/168.1 R |
| 4,193,438 | A | * | 3/1980 | Pastore | E06B 9/362<br>160/168.1 V |
| 4,291,738 | A | * | 9/1981 | Grenga | E06B 9/367<br>160/176.1 R |
| 4,332,288 | A | * | 6/1982 | Frentzel | E06B 9/364<br>160/176.1 V |
| 4,335,775 | A | * | 6/1982 | Frentzel | E06B 9/362<br>160/168.1 V |
| 4,356,855 | A | * | 11/1982 | Holzer | E06B 9/367<br>160/178.1 R |
| 4,390,055 | A | * | 6/1983 | Fenley | A47H 13/14<br>160/348 |
| 5,297,607 | A | * | 3/1994 | Beauchamp | E06B 9/367<br>160/84.04 |
| 5,555,603 | A | * | 9/1996 | Chester | A47H 13/04<br>16/87.4 R |
| 5,720,331 | A | * | 2/1998 | Antonetti | E06B 9/36<br>160/168.1 V |
| 5,960,967 | A | * | 10/1999 | Neil | A47H 1/144<br>211/94.01 |
| 6,334,477 | B1 | * | 1/2002 | Moir | E06B 9/264<br>160/168.1 V |
| 6,510,885 | B1 | * | 1/2003 | Shih | E06B 9/262<br>160/236 |
| 6,675,858 | B2 | * | 1/2004 | Marocco | E06B 9/262<br>160/168.1 V |
| 6,786,269 | B2 | * | 9/2004 | Senesac | E06B 9/262<br>160/168.1 V |
| 6,948,543 | B1 | * | 9/2005 | Sans Folch | E06B 9/362<br>160/168.1 V |
| 7,163,043 | B2 | * | 1/2007 | Huang | E06B 9/264<br>160/84.04 |
| 7,556,081 | B2 | * | 7/2009 | Cech | E06B 9/264<br>160/177 V |
| 7,735,189 | B2 | * | 6/2010 | Richardson | A47H 15/04<br>24/716 |
| 7,775,250 | B2 | * | 8/2010 | Filipiak, Jr. | E06B 9/386<br>160/168.1 V |
| 8,875,770 | B1 | * | 11/2014 | Martin | A47K 3/38<br>160/124 |
| 9,578,995 | B2 | * | 2/2017 | Hanley | A47H 13/04 |
| 11,187,031 | B2 | * | 11/2021 | Huang | E06B 9/386 |
| D971,711 | S | * | 12/2022 | Sachs | D8/383 |
| 12,024,945 | B2 | * | 7/2024 | Schulman | E06B 9/386 |
| 12,110,740 | B2 | * | 10/2024 | Huang | E06B 9/365 |
| 12,173,557 | B2 | * | 12/2024 | Albertini | E06B 9/367 |
| 12,195,888 | B2 | * | 1/2025 | Byun | E06B 9/362 |
| D1,070,570 | S | * | 4/2025 | Byeon | D8/367 |
| 12,404,718 | B2 | * | 9/2025 | Schulman | E06B 9/367 |
| 2001/0054490 | A1 | | 12/2001 | Corey et al. | |
| 2003/0056326 | A1 | * | 3/2003 | Ko | E06B 9/362<br>16/336 |
| 2006/0249261 | A1 | * | 11/2006 | Elembaby | E06B 9/36<br>160/89 |
| 2007/0006979 | A1 | * | 1/2007 | Hsu | E06B 9/262<br>160/89 |
| 2007/0261330 | A1 | * | 11/2007 | Liu | A47H 13/04<br>52/235 |
| 2007/0267153 | A1 | * | 11/2007 | Hardy | E06B 9/262<br>160/168.1 V |
| 2008/0236766 | A1 | * | 10/2008 | Vandervoort | B29C 66/73116<br>160/172 V |
| 2009/0038765 | A1 | * | 2/2009 | Hall | A47H 13/04<br>160/368.1 |
| 2009/0223640 | A1 | | 9/2009 | Chen | |
| 2012/0018106 | A1 | * | 1/2012 | Robledo | A47H 1/04<br>160/330 |
| 2012/0246877 | A1 | * | 10/2012 | Mormino | E06B 9/367<br>160/177 V |
| 2017/0354285 | A1 | * | 12/2017 | Kim | E06B 9/364 |
| 2020/0308733 | A1 | * | 10/2020 | Byun | E06B 9/42 |
| 2021/0120994 | A1 | * | 4/2021 | Gwen | A47H 13/01 |
| 2023/0003082 | A1 | * | 1/2023 | Albertini | E06B 9/36 |
| 2023/0046453 | A1 | * | 2/2023 | Williams | A47H 13/01 |
| 2023/0132417 | A1 | * | 5/2023 | Huang | E06B 9/262<br>160/166.1 |

FOREIGN PATENT DOCUMENTS

| | | | | | |
|---|---|---|---|---|---|
| GB | 2428194 | A | * | 1/2007 | E06B 9/365 |
| KR | 20-1998-0026153 | U | | 8/1998 | |
| KR | 200261897 | Y1 | * | 1/2002 | |
| KR | 20-0346670 | Y1 | | 4/2004 | |
| KR | 100904173 | B1 | * | 6/2009 | E06B 9/36 |
| KR | 10-1160254 | B1 | | 6/2012 | |
| KR | 10-1881501 | B1 | | 7/2018 | |
| KR | 10-1908979 | B1 | | 10/2018 | |
| KR | 20230119602 | A | * | 8/2023 | E06B 9/36 |

* cited by examiner

CONNECTING MEMBER HAVING HOOK MEMBER FOR VERTICAL BLIND, AND CURTAIN AND VERTICAL BLIND USING SAME

CROSS-REFERENCE TO RELATED APPLICATIONS

This is continuation of International Application No. PCT/KR2022/018221 filed on Nov. 17, 2022, which claims priority to Korean Application No. 10-2021-0159560 filed on Nov. 18, 2021 and Korean Application No. 10-2022-0152956 filed on Nov. 15, 2022, the entire contents of which are herein incorporated by reference.

TECHNICAL FIELD

The present disclosure relates to a connecting member having a hook member for a vertical blind, and a vertical blind with a curtain function using the same and, more particularly, to a connecting member having a hook member for a vertical blind, and a vertical blind with a curtain function using the same, in which the vertical blind includes connection holes at the upper side of a blind sheet in which a transparent part and a light blocking part are disposed alternately, and a connecting member having protruding hook members so that the connection holes can be held by the hook members, thereby facilitating the installation and use of a vertical blind with a curtain function.

BACKGROUND ART

The market of curtains and vertical blinds is very broad because they can block sunlight due to temperature changes in the summer, while also controlling the amount of light transmitted to desired angle and direction, and controlling the strength of the wind in the winter and the amount of direct sunlight for the effect of warmth.

A vertical, which is a curtain-type vertical adjustment system, can be moved left and right with an adjustment rail at the top, allowing one or both sides thereof to gather and spread, and has a fixed hook that rotates 180 degrees, thereby blocking light and controlling a light transmission function.

In addition, a vertical blind with a curtain function includes multiple sets of blinds, wherein the blind includes a transparent part having a predetermined size and light blocking parts disposed respectively on the opposite sides of the transparent part.

In addition, when installed on a rail attached to a ceiling by using a connection tool, the conventional vertical blind with a curtain function operates after two light blocking parts are fixed to one connection tool and the connection tool is inserted into the rail, wherein, when fixing the two light blocking parts to the one connection tool, the two light blocking parts may be incorrectly fixed, and the shapes thereof may change. For example, when one light blocking part of two light blocking parts was fixed without being vertical, there was a problem in that light was not completely blocked or the shape of the product was not formed properly, deteriorating marketability.

In particular, when trying to install a DIY vertical blind, a less-skilled consumer purchases a vertical blind and clips separately and performs installation thereof by himself or herself, and at the stage at which the consumer fixes the clips to a light blocking part of the blind, when the blind is fixed without being vertical, there was a problem that light was not completely blocked or the product was installed unevenly, seriously deteriorating marketability thereof.

Accordingly, there is a demand for the development of a blind with a curtain function, in which the blind includes connection holes provided in the upper end of a blind sheet, and a connecting member having hook members provided on opposite sides thereof, with the connection holes held by the hook members, respectively, thereby simplifying the installation process of a vertical blind with a curtain function and facilitating the installation of the vertical blind so that marketability is not reduced.

DOCUMENTS OF RELATED ART

Patent Documents (Patent Document 1) Korean Patent No. 10-1908979
(Patent Document 2) Korean Patent No. 10-1160254

SUMMARY

Technical Problem

The present disclosure has been made to solve the above problems occurring in the prior art, and is intended to propose a connecting member having a hook member for a vertical blind, and a vertical blind with a curtain function using the same, in which the vertical blind includes a blind sheet having connection holes formed on the upper side of a light blocking part, and the connecting member having hook members formed on a body thereof by protruding therefrom, with the hook members allowing the connection holes to be held thereby and having hook shapes, wherein the connecting member is configured so that neighboring blind sheets can be held on opposite side surfaces or on one side surface of the connecting member, thereby simplifying the installation process of a vertical blind sheet and ultimately preventing marketability from reducing.

Technical Solution

In order to accomplish the above objectives, the present disclosure provides

- a connecting member including: an attachment tool coupled to each of runners that are successively arranged in an inner space of a rail coupled to a ceiling; a body arranged on a lower side of the attachment tool; and a hook member formed on the body by protruding therefrom and having a hook shape.

In addition, in order to accomplish the above objectives, the present disclosure provides a vertical blind with a curtain function, the vertical blind including a connecting member, and a blind sheet mounted to the connecting member and having a transparent part and light blocking parts disposed respectively on opposite sides of the transparent part.

Advantageous Effects

According to the connecting member having a hook member for a vertical blind, and the vertical blind with a curtain function using the same according to the present disclosure, the vertical blind includes the blind sheet having connection holes formed in the upper side of the light blocking part, and the connecting member having the hook member protruding on the opposite side surfaces or one side surface of the body, the hook member being held in each of the connection holes and having a hook shape, wherein simply holding the connection hole by the hook member makes the blind sheet horizontal so that the connecting member and the vertical blind according to the present disclosure can be installed in an orderly fashion. This simplifies the installation process of the vertical blind with a curtain function, allowing even less skilled consumers to easily install the vertical blind.

In addition, neighboring blind sheets are disposed to be held by the hook members on the opposite side surfaces or one side surface of the body of the connecting member, wherein the blind sheets are connected to the connecting member in such a manner that the transparent part is bent into a semicircular arc shape and the light blocking parts face each other so that the light blocking part and the light blocking part are in close contact with each other, thereby easily implementing a light blocking function.

Furthermore, the body is configured so that the attachment tool is disposed on the center of gravity of the body at which the body can be maintained to be horizontal while the blind sheet is held on the body, and thus the body is precisely balanced to be vertical, thereby preventing decline in marketability.

DESCRIPTION OF DRAWINGS

FIG. 2(*b*) is a second configuration diagram illustrating the configuration of the blind sheet according to the present disclosure.

FIG. 3(*b*) is a fourth configuration diagram illustrating the configuration of the blind sheet according to the present disclosure.

FIG. 4(*b*) is a second configuration diagram illustrating the configuration of the connecting member according to the present disclosure.

FIG. 5(*b*) is a fourth configuration diagram illustrating the configuration of the connecting member according to the present disclosure.

FIG. 7(*b*) is a seventh configuration diagram illustrating the configuration of the connecting member according to the present disclosure.

FIG. 8(*b*) is a ninth configuration diagram illustrating the configuration of the connecting member according to the present disclosure.

FIG. 13(*b*) is a second side view of the connecting member and the blind sheet according to the present disclosure.

FIG. 14(*b*) is a fourth side view of the connecting member and the blind sheet according to the present disclosure.

FIG. 15(*b*) is a fifth side view of the connecting member and the blind sheet according to the present disclosure.

FIG. 17(*b*) is an eight side view of the connecting member and the blind sheet according to the present disclosure.

FIG. 18(*b*) is a tenth side view of the connecting member and the blind sheet according to the present disclosure.

FIG. 19(*b*) is a second elevation view of the connecting member according to the present disclosure.

FIG. 20(*b*) is a fourth elevation view of the connecting member according to the present disclosure.

FIG. 22(*b*) is a seventh elevation view of the connecting member according to the present disclosure.

DETAILED DESCRIPTION

In explaining embodiments of the present disclosure, when it is judged that a detailed description of the known technology related to the present disclosure may unnecessarily obscure the gist of the present disclosure, detailed description thereof will be omitted. In addition, terms described below are terms defined in consideration of functions thereof in the present disclosure, and may vary depending on the intention or practices of a user or operator. Therefore, definition of the terms should be made based on contents throughout this specification. Terms used in the detailed description merely describe the embodiments of the present disclosure and should in no way be construed as limiting. Unless explicitly stated otherwise, singular forms include plural meanings. In this description, expressions such as "including" or "having" are intended to indicate certain features, numbers, steps, operations, elements, or a part or combination thereof, and should not be construed to exclude the existence or possibility of one or more other features, numbers, steps, operations, elements, or a part or combination thereof besides those described.

Hereinafter, specific embodiments of the present disclosure will be described with reference to the drawings. The detailed description below is provided to facilitate a comprehensive understanding of the methods, devices and/or systems described herein. However, this is only an example and the present disclosure is not limited thereto. However, this is only an example and the present disclosure is not limited thereto. Hereinafter, preferred embodiments according to the present disclosure will be described with reference to the attached drawings.

Figure 1:
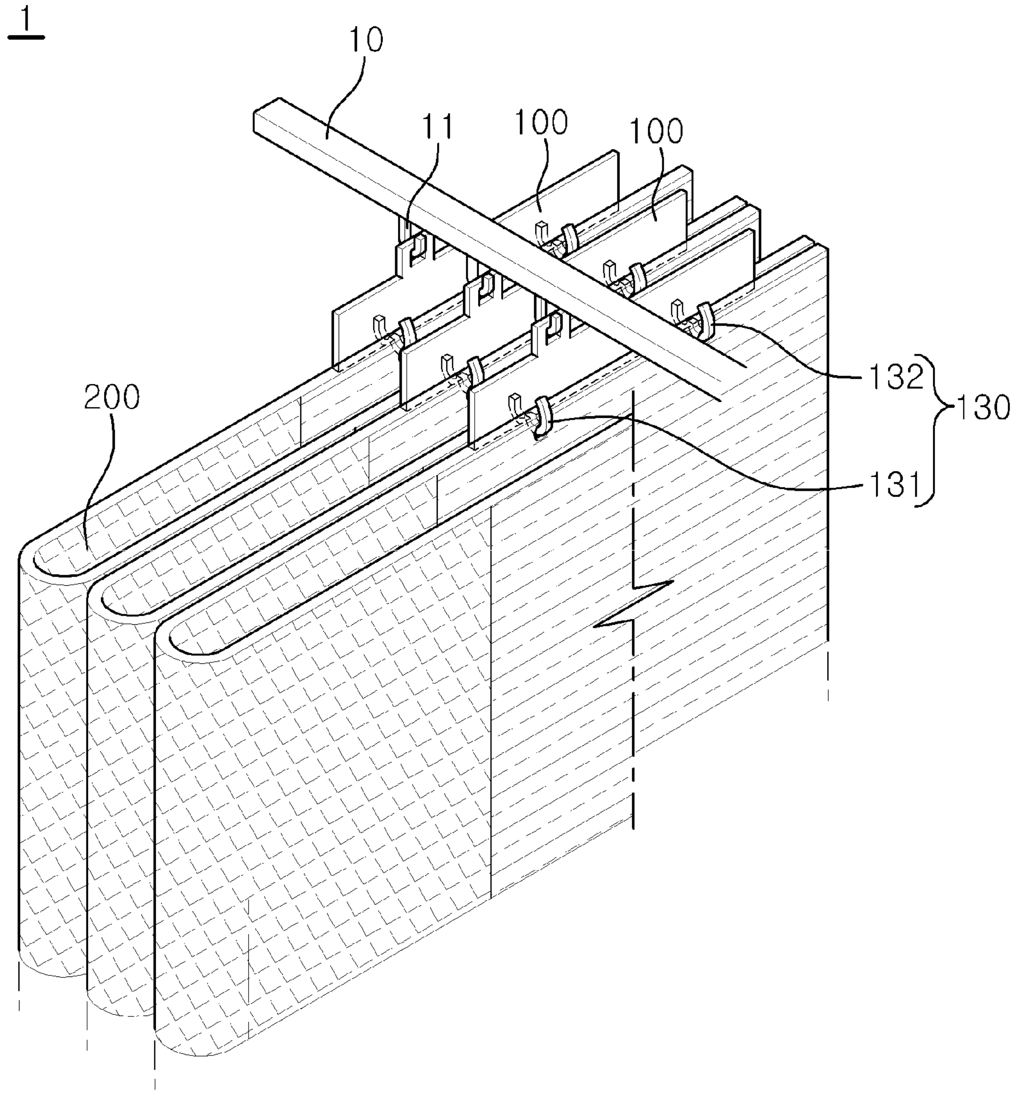
FIG. 1 is a configuration diagram illustrating the general configuration of a connecting member having a hook member for a vertical blind and a vertical blind with a curtain function using the same according to an embodiment of the present disclosure.

FIG. 1 is a configuration diagram illustrating the general configuration of a connecting member having a hook member for a vertical blind and a vertical blind with a curtain function using the same according to the present disclosure, and as illustrated in FIG. 1, the vertical blind may include a connecting member 100 and a blind sheet 200.

As illustrated in FIG. 1, the connecting member 100 is fixed to each of multiple runners 11 arranged in the inner space of a rail 10 coupled to a ceiling and may be configured such that neighboring blind sheets 200 at opposite sides of the connecting member can be held thereby. In addition, the connecting member 100 may be configured such that neighboring blind sheets 200 at one side of the connecting member 100 can all be held thereby.

Accordingly, the connecting member 100 may include an attachment tool 120 coupled to each of the runners 11, a body 110 disposed on the lower side of the attachment tool 120, and a hook member 130 protruding on each of the opposite side surfaces of the body 110 to correspond to a connection hole 230 of the blind sheet 200 and having a hook shape so that the connection hole 230 is held by the hook member.

Figure 2A:
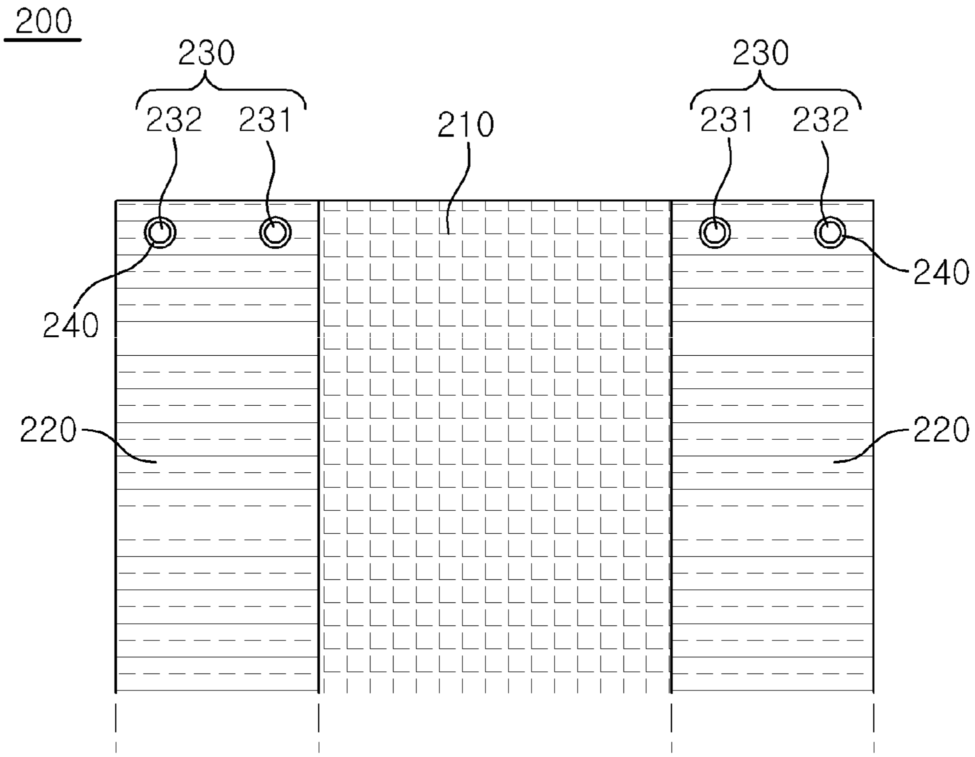
FIG. 2(*a*) is a first configuration diagram illustrating the configuration of a blind sheet according to the present disclosure.
Figure 2B:
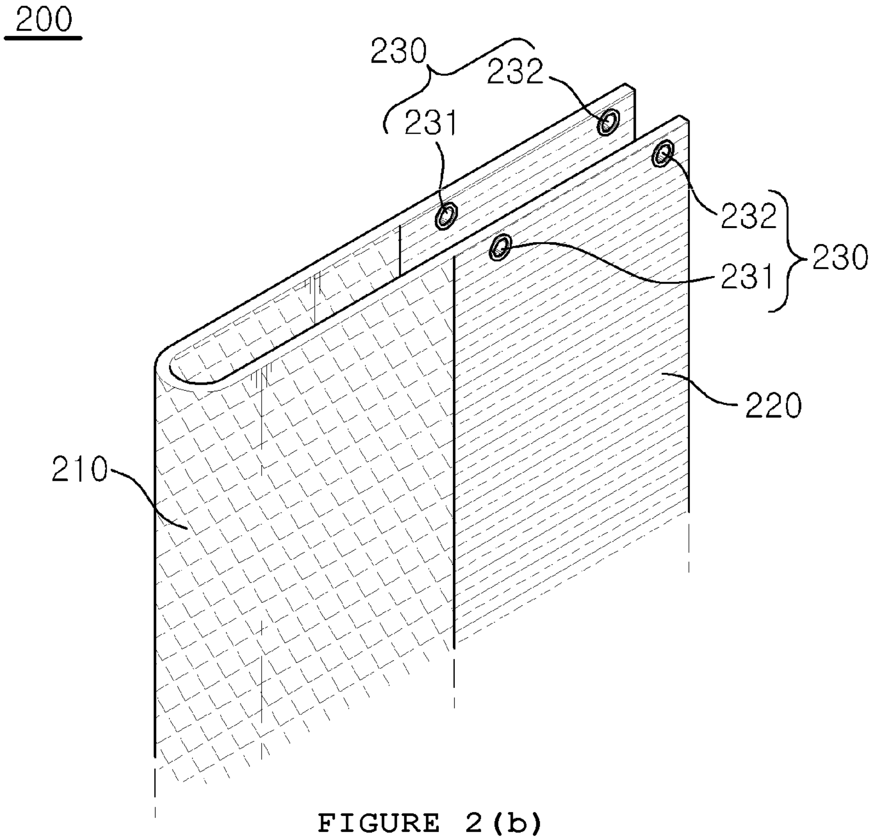

FIG. 2(*a*) is a first configuration diagram illustrating the configuration of the blind sheet 200 according to the present disclosure. According to the first embodiment of the blind sheet 200, light blocking parts 220 may be located on the opposite ends of a transparent part 210. The connection hole 230 of the blind sheet 200 may be provided on each of the upper left and right sides of each of the light blocking parts 220, and may correspond to the hook-shaped hook member 130 of the connecting member 100 to be described later.

The connection hole 230 may be provided in various shapes, and as illustrated in FIG. 2(*a*), as one embodiment of the blind sheet 200, two circular connection holes 231 and 232 may be formed on each of the light blocking parts by being spaced by a predetermined distance apart from each other. In addition, each of the connection holes 231 and 232 is provided with an eyelet on a circumference thereof, and thus the blind sheet 200 can be protected from the hook members 130 to be inserted into the connection holes 231 and 232.

FIG. 2(*b*) is a second configuration diagram illustrating the configuration of the blind sheet 200 according to the present disclosure. According to the second embodiment of the blind sheet 200, the transparent part 210 of the blind sheet 200 is bent into a semicircular arc shape so that the light blocking parts 220 face each other, that is, into a "U" shape, and accordingly, the blind sheet 200 may be connected to the connecting member 100 to be described later by the connection holes 231 and 232.

Specifically, the blind sheet 200 has the light blocking part 220 disposed on each of opposite sides thereof, and the transparent part 210 disposed on a center thereof to form one unit of the blind sheet, wherein the transparent part 210 is bent into a semicircular arc shape so that the transparent part 210 is placed on an indoor side so that the blind sheet can be installed by being held by the connecting member.

Accordingly, in the blind sheet 200, the angle of the transparent part 210 and the light blocking part 220 is controlled so that a user can selectively use the light blocking function of the blind.

Figure 3A:
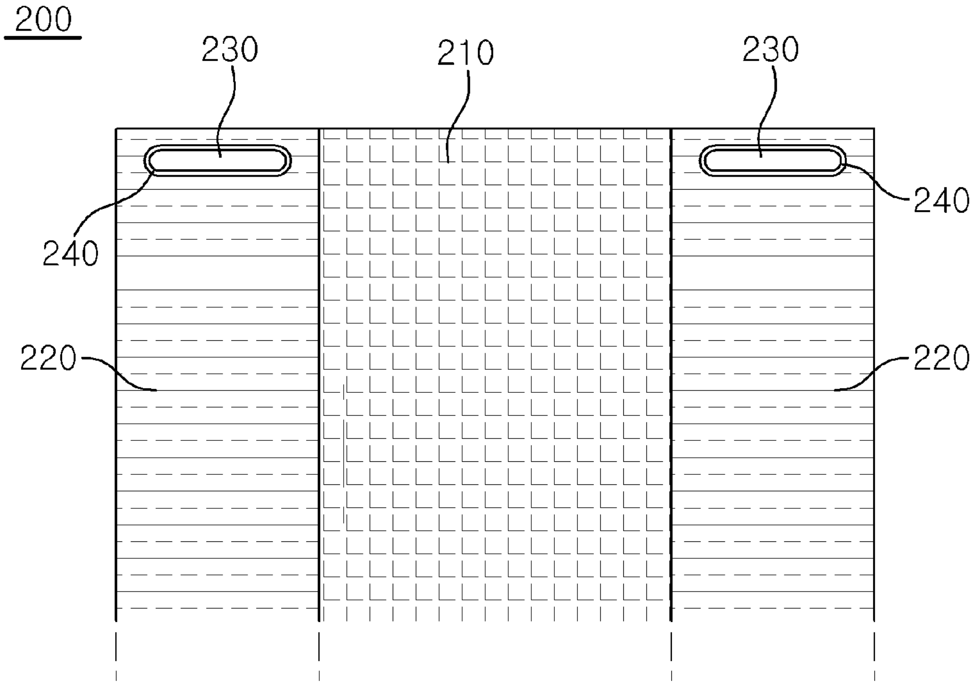
FIG. 3(*a*) is a third configuration diagram illustrating the configuration of the blind sheet according to the present disclosure.
Figure 3B:
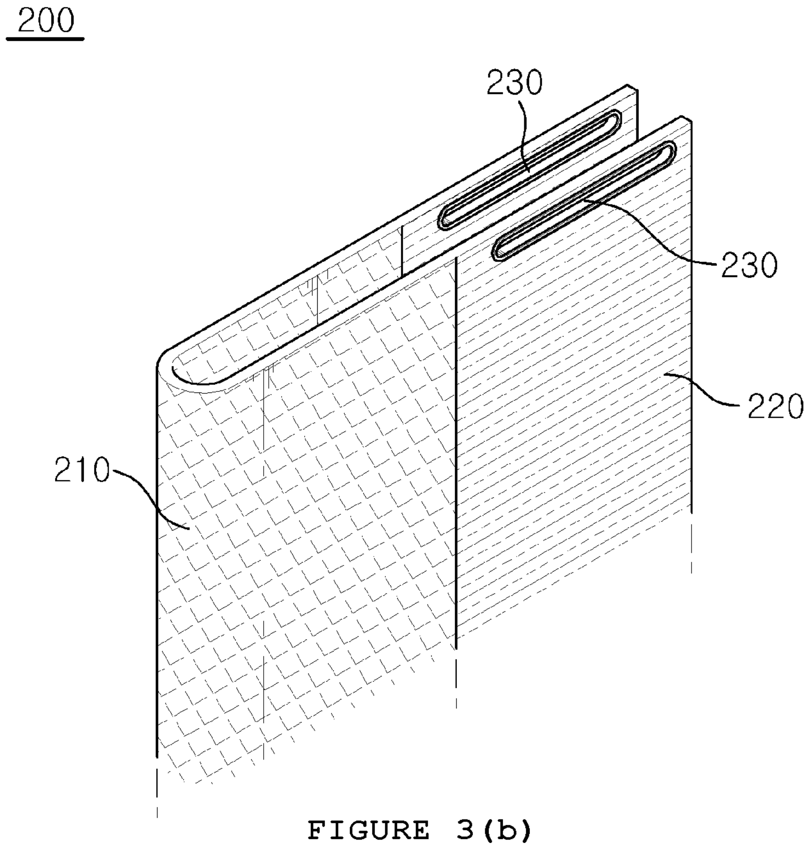

FIG. 3(*a*) is a third configuration diagram illustrating the configuration of the blind sheet 200 according to the present disclosure. According to the third embodiment of the blind sheet 200, the connection hole 230 in the first configuration diagram illustrated in FIG. 2(*a*) may be provided in an oval shape with a long hole formed in the upper part of the light blocking part 220. Even in this case, the connection hole 230 has the eyelet 240 provided on a periphery thereof so that the blind sheet 200 can be protected from the hook member 130 to be inserted into each of the connection holes 231 and 232. In this case, the connection hole 230 may include a first connection hole 231 adjacent to the transparent part 210 and a second connection hole 232 disposed to be spaced apart from the first connection hole 231.

According to still another embodiment of the present disclosure, a film may be attached to a certain portion of the light blocking part 220 to protect the fabric thereof from being damaged. Particularly, the blind sheet may be damaged due to friction between the blind sheet and the hook member, and thus to prevent this, the film may be heat-adhered to the edge of the connection hole 230 of the light blocking part. Instead of the eyelet 240 mentioned above, a film may be attached on the periphery of the connection hole 230. In addition, the film may be inserted into the upper part of the fabric to form the blind sheet into a structure so that the blind sheet can withstand friction.

Accordingly, the connection hole 230 includes the first connection hole 231 and the second connection hole 232 disposed in the upper side of the light blocking part 220, and the first connection hole 231 and the second connection hole 232 are held by a first hook 131 and a second hook 132 of the connecting member 100, respectively, wherein the first connection hole 231 is held by the first hook 131 of the connecting member 100, and the second connection hole 232 is held by the second hook 132 of the connecting member 100.

FIG. 3(*b*) is a fourth configuration diagram illustrating the configuration of the blind sheet 200 according to the present disclosure. According to the fourth embodiment of the blind sheet 200, in the second configuration diagram illustrated in FIG. 2(*b*), the connection hole 230 formed in the upper part of the light blocking part 220 may be provided in an oval shape with a long hole. Even in this case, the eyelet 240 is provided on the periphery of the connection hole, and thus when the hook member 130 is inserted into each of the connection holes 231 and 232, the blind sheet 200 can be protected.

Figure 4A:
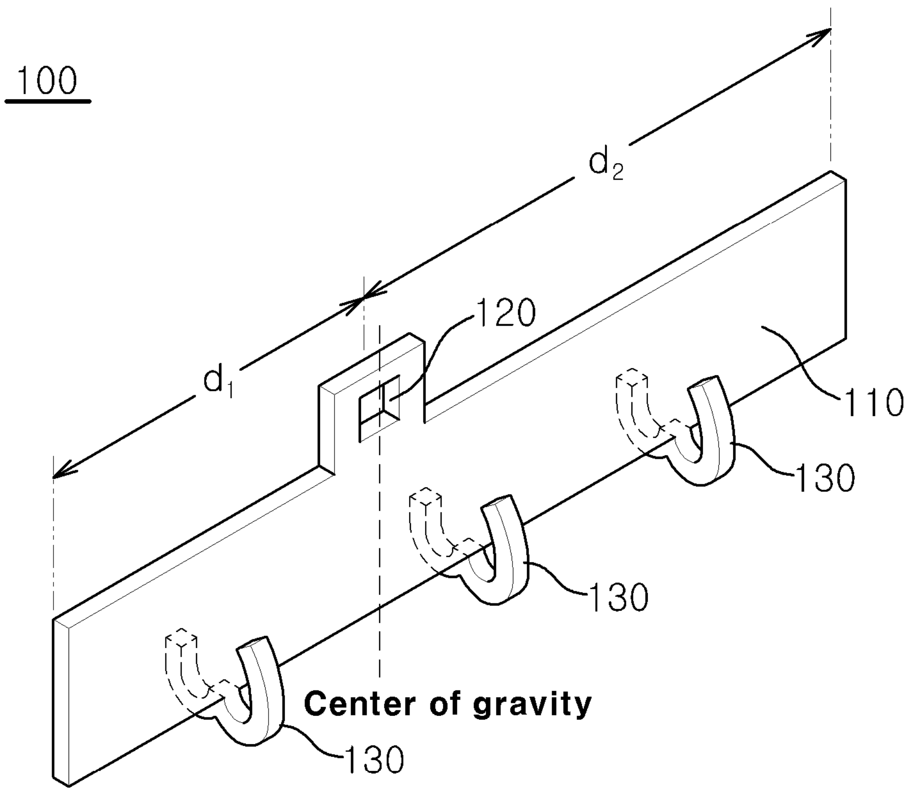
FIG. 4(*a*) is a first configuration diagram illustrating the configuration of the connecting member according to the present disclosure.
Figure 4B:
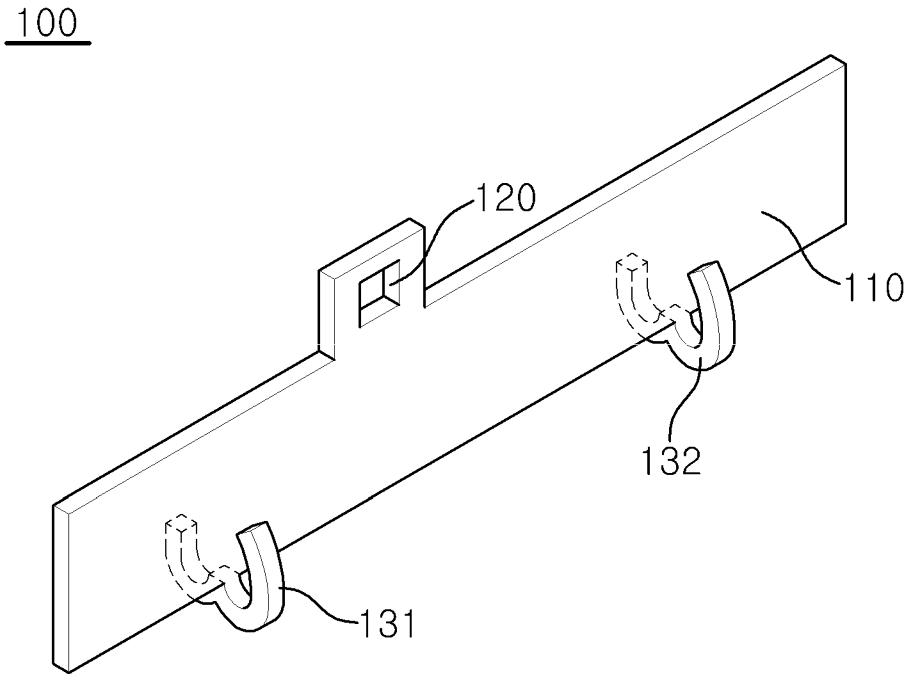

FIG. 4(*a*) is a first configuration diagram illustrating the configuration of the connecting member according to the present disclosure. According to the first embodiment of the connecting member 100, the body 110 has a plate shape having a quadrangular cross-section with the long horizontal length of the exterior of the connecting member 100, wherein one attachment tool 120 may be disposed on the upper side of the body 110, and the hook members 130 may be formed to protrude on opposite side surfaces.

The hook member 130 may include one pair of first hooks 131 disposed correspondingly on the opposite side surfaces of the body 110 so that the first connection hole 231 to be described later is held thereby, and one pair of second hooks 132 disposed on the opposite side surfaces of the body 110 to be spaced by a predetermined distance apart from the first hooks 131 so that the second connection hole 232 to be described later is held thereby.

At this time, the first connection hole 231 is a connection hole, which is adjacent to the transparent part 210, of the connection holes 230 formed in the upper part of the light blocking part 220 of the blind sheet 200, and the second connection hole 232 is a connection hole spaced by a predetermined distance apart from the first connection hole 231.

Accordingly, in the hook member 130, a first hook 131 disposed on a first side surface of the body 110 holds a first connection hole 231 of a first side blind sheet 200, and a first hook 131 disposed on a second side surface of the body 110 holds a first connection hole 231 of a second side blind sheet 200.

In addition, in the hook member 130, a second hook 132 disposed on the first side surface of the body 110 holds a second connection hole 232 of the first side blind sheet, and a second hook 132 disposed on the second side surface of the body 110 holds a second connection hole 232 of the second side blind sheet 200.

Accordingly, the connecting member 100 may be configured so that the first side blind sheet 200 is held by the first hook 131 and the second hook 132 disposed on the first side surface of the body 110, and the second side blind sheet 200 neighboring to the first side blind sheet 200 is held by the first hook 131 and the 5 second hook 132 disposed on the second side surface of the body 110.

In addition, as illustrated in FIG. 4(*a*), the attachment tool 120 may be disposed on the center of gravity of the body 110 at which the body 110 can be maintained to be horizontal while the blind sheet 200 is held on the body 110. For example, the body 110 may be configured so that the ratio $d_1:d_2$ of a distance $d_1$ between a position at which the attachment tool 120 is disposed and a first end of the body directed to the center of the blind sheet 200 and a distance $d_2$ between the position at which the attachment tool is disposed and a second end of the body is 1:2.

In addition, the ratio $d_1:d_2$ of the body 110 of the present disclosure may be implemented at various ratios depending on the position of the center of gravity according to the ratio of the transparent part 210 and the light blocking part 220. This may be a structure in which the body 110 is horizontally balanced with respect to the weight of the blind sheet 200 held on each of the opposite side surfaces of the body 110 while the attachment tool 120 is fixed to the runner 11.

The transparent part 210 is bent into a semicircular arc shape and the light blocking parts 220 face each other to be connected to the connecting member 100 so that the weight of the transparent part 210 of the blind sheet 200 is supported, and accordingly, the first end of the body 110 adjacent to the transparent part 210 may bear a greater weight than the second end of the body 110.

In addition, even in the hook member 130 provided on the body 110, a hook member 130 adjacent to the transparent part 210 may bear a greater weight than a hook member 130 far from the transparent part 210.

Accordingly, when the attachment tool 120 is placed at the center of the horizontal length of the body 110, the body 110 is tilted toward the transparent part 210 due to the weight of the transparent part 210 of the blind sheet 200, and thus the horizontality of the body 110 cannot be maintained.

Accordingly, the body 110 of the present disclosure is configured so that the ratio of distances up to the opposite ends of the body relative to the attachment tool 120 is appropriate depending on a case as described above, so the body 110, which supports the weight of the blind sheet 200, can be made to remain horizontal without tilting.

The hook member 130, which has a hook shape, protrudes on each of opposite side surfaces or one surface of the body 110 so that the connection hole 230 of the blind sheet 200 is held by the hook member, and may include multiple hook members disposed on each side surface. As illustrated in FIG. 4(*a*), three hook members may be formed on each of the opposite side surfaces by being spaced by a predetermined distance apart from each other, and as illustrated in FIG. 4(*b*), two hook members may be formed on each of the opposite side surfaces. In addition, as illustrated in FIGS. 5(*a*), 5(*b*), and FIG. 6, one body 110 may be formed on each side surface, and the length of the hook member 130 may be varied.

Figure 5A:
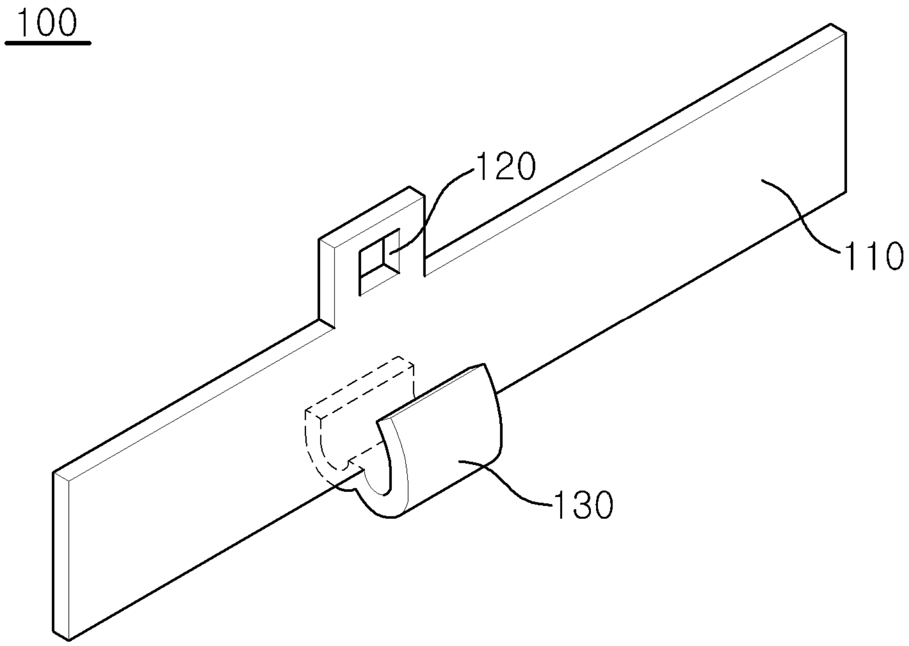
FIG. 5(*a*) is a third configuration diagram illustrating the configuration of the connecting member according to the present disclosure.
Figure 5B:
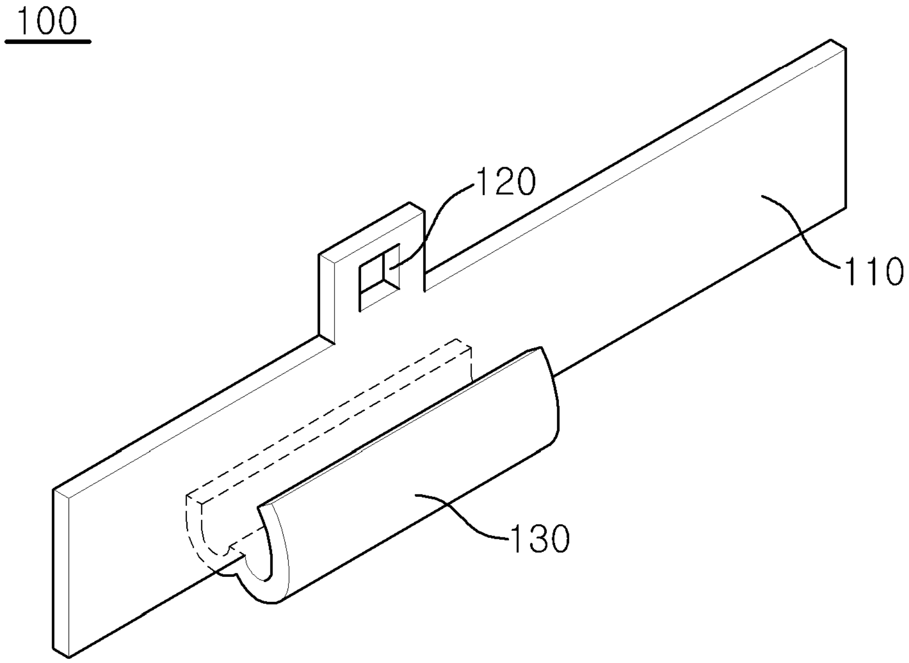
Figure 6:
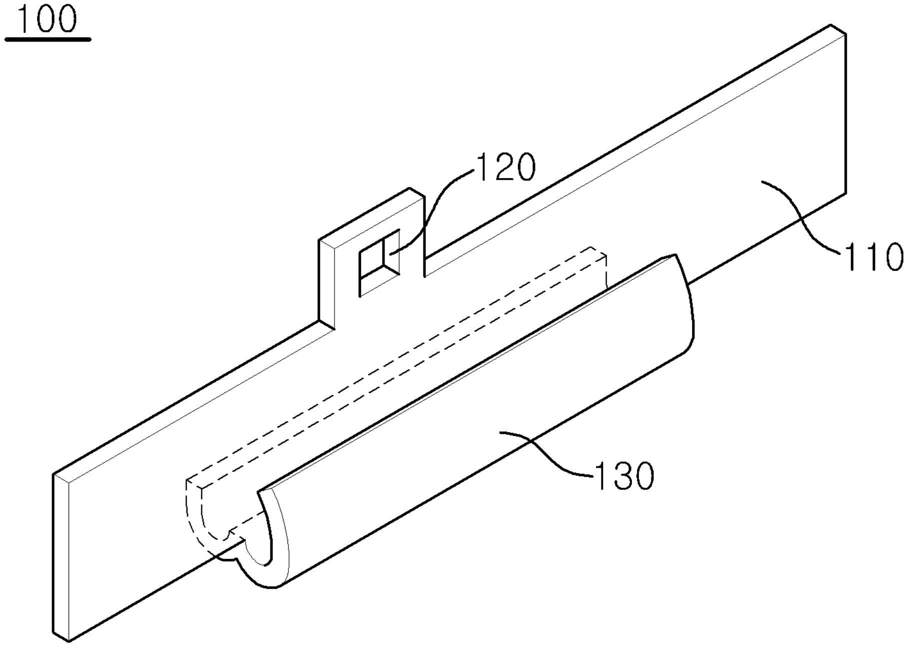
FIG. 6 is a fifth configuration diagram illustrating the configuration of the connecting member according to the present disclosure.

As illustrated in FIG. 5(*a*), the hook member 130 may be formed as long as the attachment tool 120, and as illustrated in FIGS. 5(*b*) and 6, the hook member 130 may be formed to be much longer than the length of the attachment tool 120. Like the shape of the hook mentioned above, the hook is not limited to a specific length, and may be formed to correspond to the shape and length of the connection hole 230 into which the hook is inserted.

Figure 7A:
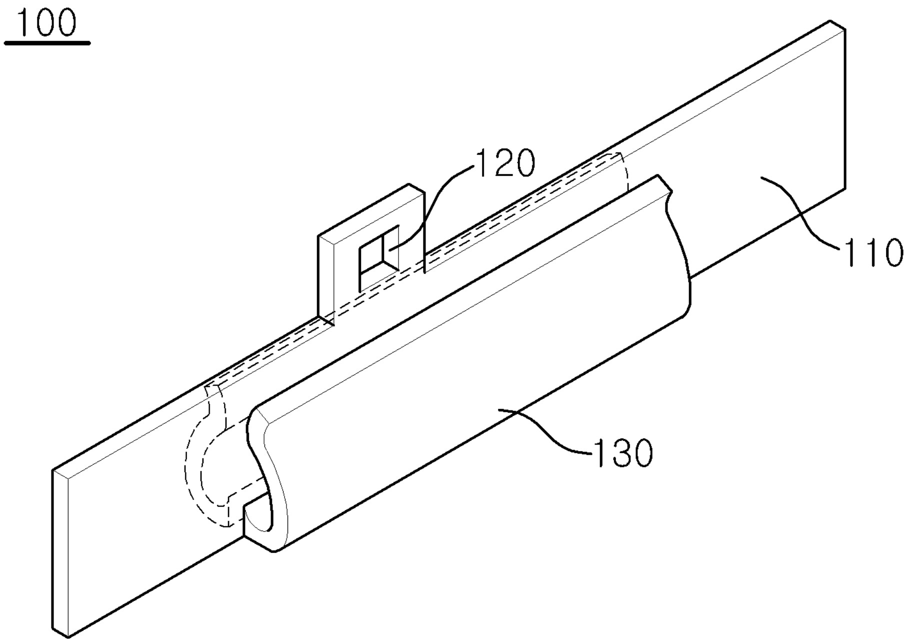
FIG. 7(*a*) is a sixth configuration diagram illustrating the configuration of the connecting member according to the present disclosure.
Figure 7B:
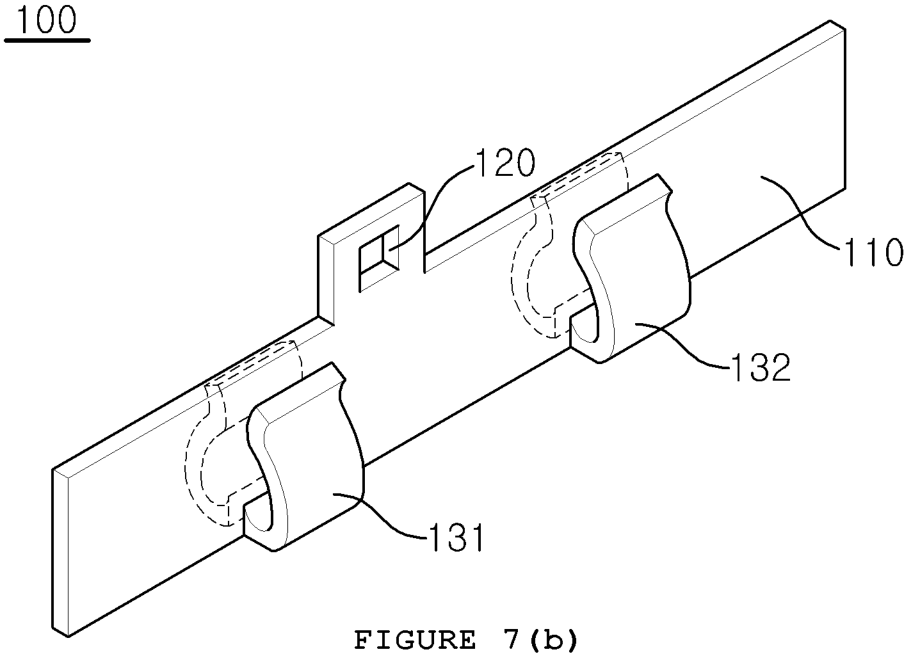

The shape of the hook member 130 is basically a hook shape, but as illustrated in FIG. 7(*a*) or 7(*b*), the shape of the cross section of the hook member 130 may be similar to an 'S' shape. This allows the upper part of the inner surface of the hook member 130 to naturally prevent the removal of the blind sheet 200 held by the hook member 130 when the blind sheet 200 is held by the hook member 130.

Figure 8A:
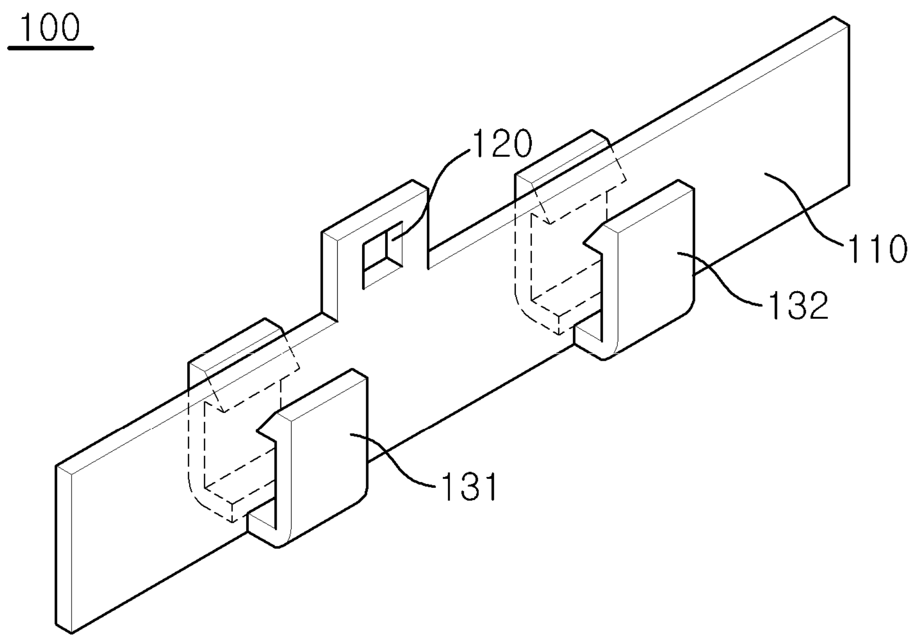
FIG. 8(*a*) is an eighth configuration diagram illustrating the configuration of the connecting member according to the present disclosure.
Figure 8B:
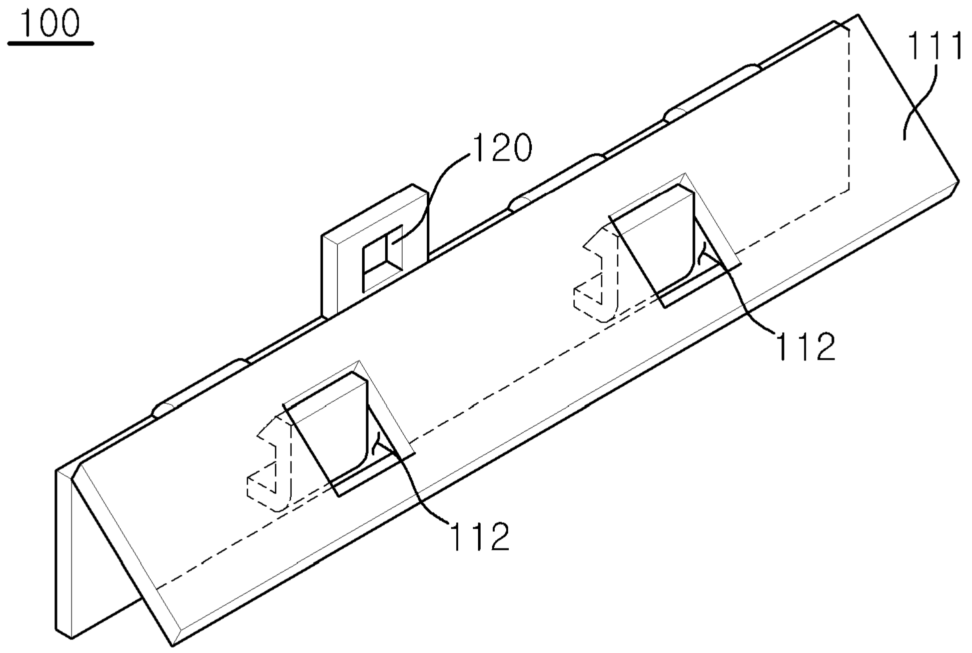
Figure 9:
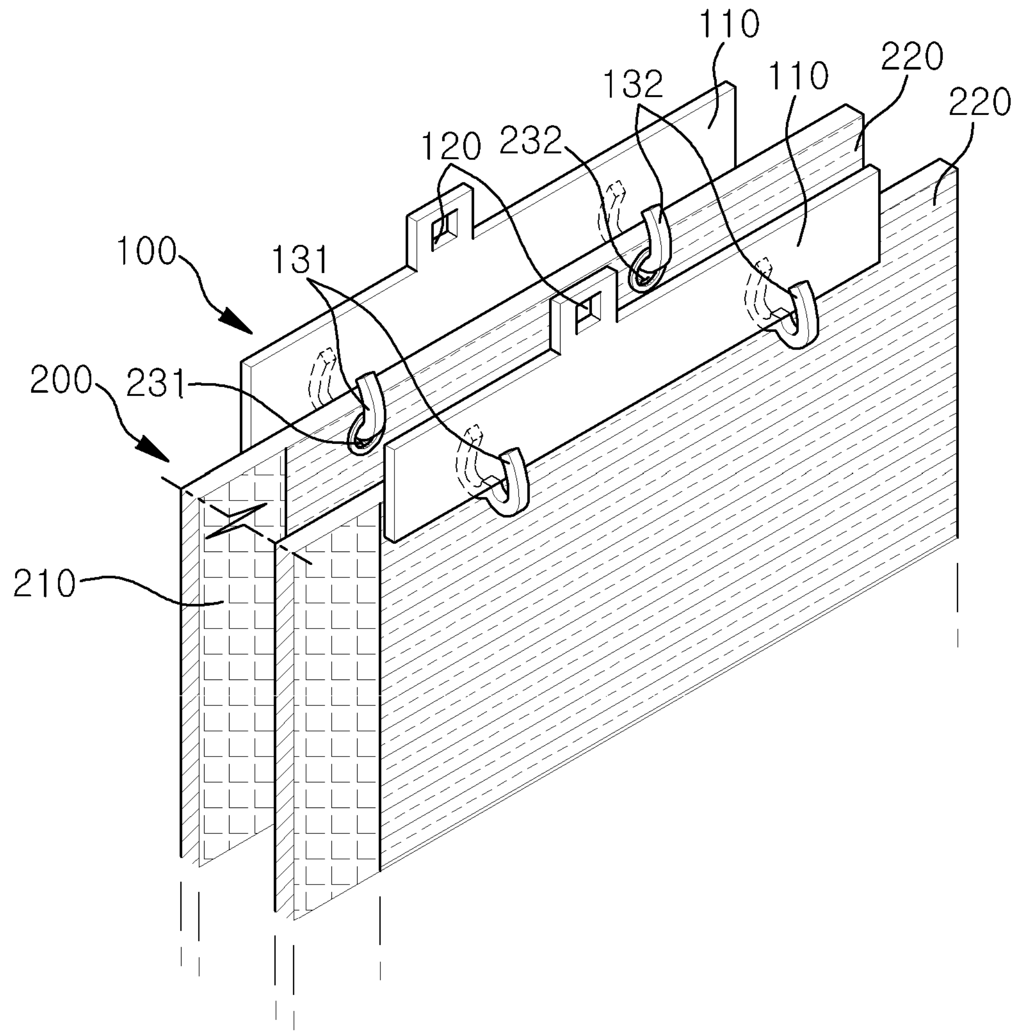
FIG. 9 is a first state diagram illustrating the state of the use of the connecting member having a hook member for a vertical blind, and the vertical blind with a curtain function using the same according to the present disclosure.

In addition, according to another embodiment of the hook member 130, as illustrated in FIG. 8(*a*), the end of the hook member 130 may be formed in a shape similar to a 'fish hook'. In this embodiment, one side of the end of the hook member 130 is formed in a tapered structure so that the connection hole 230 of the blind sheet 200 can be slidably connected to the hook member 130, so the connection hole 230 and the hook Member 130 can be connected to each other more smoothly than before. After the blind sheet 200 having the connection hole 230 into which the hook member 130 is inserted is connected to the hook member 130, the removal of the blind sheet 200 from the hook member 130 may be difficult due to the tapered structure of the end of the hook member 130. The above effect can be equally applied not only when one blind sheet 200 is combined with the hook member 130, but also when a plurality of blind sheets 200 is combined therewith. The shape of the hook of the connecting member is not limited to the special shape in the drawing, and any shape of a hook which can hold the connection hole and maintain the connection of the hook with the blind sheet 200 may be applied.

In addition, according to still another embodiment of the hook member 130, as illustrated in FIG. 8(*b*), a fixing cover 111 connected to the upper end of the body 110 and lying correspondingly on one side surface of the body 110 may be provided. That is, the body 110 may be provided with the fixing cover 111 having an upper end connected to the one side surface thereof, wherein the fixing cover 111 may include an opening 112 through which the hook member 130 can pass. The fixing cover 111 may have the same area as the body 110 so as to lie correspondingly on the body 110, and may include an opening 112 larger than the hook member 130 in order not to interfere with the hook member 130 the hook member 130 when the fixing cover 111 is closed. In FIG. 8(*b*), the opening 112 is illustrated in a quadrangular shape, but is not necessarily limited to this shape, and may be an opening 112 of any shape when the opening does not interfere with the hook member 130. The fixing cover 111 can prevent the blind sheet fastened into the hook member 130 from being removed therefrom, and may not be completely in close contact with the body 110 due to the volume of the blind sheet.

As illustrated in FIGS. 4(*a*) to 12, the connecting member 100 according to the present disclosure is fixed to each of multiple runners 11 that is successively arranged in the inner space of the rail 10 coupled to a ceiling, and is configured so that neighboring blind sheets 200 located at opposite sides or one side can be held by the connecting member.

Specifically, the connecting member 100 is configured in such a manner that the upper side of the connecting member 100 is coupled to the runner 11 of the rail 10 coupled to the ceiling and the blind sheet 200 is connected to the lower side of the connecting member 100 so that each of neighboring blind sheets 200 at opposite side surfaces can be held by the connecting member 100.

Accordingly, the connecting member 100 may include the attachment tool 120 coupled to the runner 11, the body 110 disposed on the lower side of the attachment tool, and the hook member 130 protruding on each of the opposite sides of the body 110 to correspond to the connection hole 230 of the blind sheet 200 and having a hook shape so that the connection hole 230 is held by the hook member 130.

As illustrated in FIGS. 1, 8(*a*), and 8(*b*), the hook members 130 may protrude on the opposite side surfaces or one side surface of the body 110.

When the hook members protrude on the opposite side surfaces of the body 110, the hook members may be configured so that the connection holes 230 of the blind sheet 200 disposed on each of the opposite sides of the body 110 are held by the hook members 131 and 132, respectively. Specifically, the hook members 130 may be configured so that the first side blind sheet 200 is held by the hook member 130 disposed on the first side surface of the body 110, and the second side blind sheet 200 neighboring to the first side blind sheet 200 is held by the hook member 130 disposed on the second side surface of the body.

When the hook member protrudes on the first side surface of the body, two blind sheets 200 may be held by the hook member 130 provided on the first side surface of the body 110. Specifically, the hook member 130 may be configured so that the first side blind sheet 200 and the second side blind sheet 200 neighboring to the first side blind sheet 200 are held all at once by the hook member 130 disposed on the first side surface of the body.

In addition, it may be preferably that the hook member 130 is formed to correspond in number and position to the connection hole 230 formed in the light blocking part 220. In addition, as described above, the hook member 130 may variously be applied without the number and arrangement thereof being limited within the body 110. For example, the hook member 130 may include one pair of hook members disposed by protruding on each of the opposite side surfaces of the body 110, so that a total of four hook members may be disposed on one body 110, and the hook member 130 may include one pair of hook members disposed by protruding on one side surface of the body, so that a total of two hook members may be disposed on one body 110.

Figure 10:
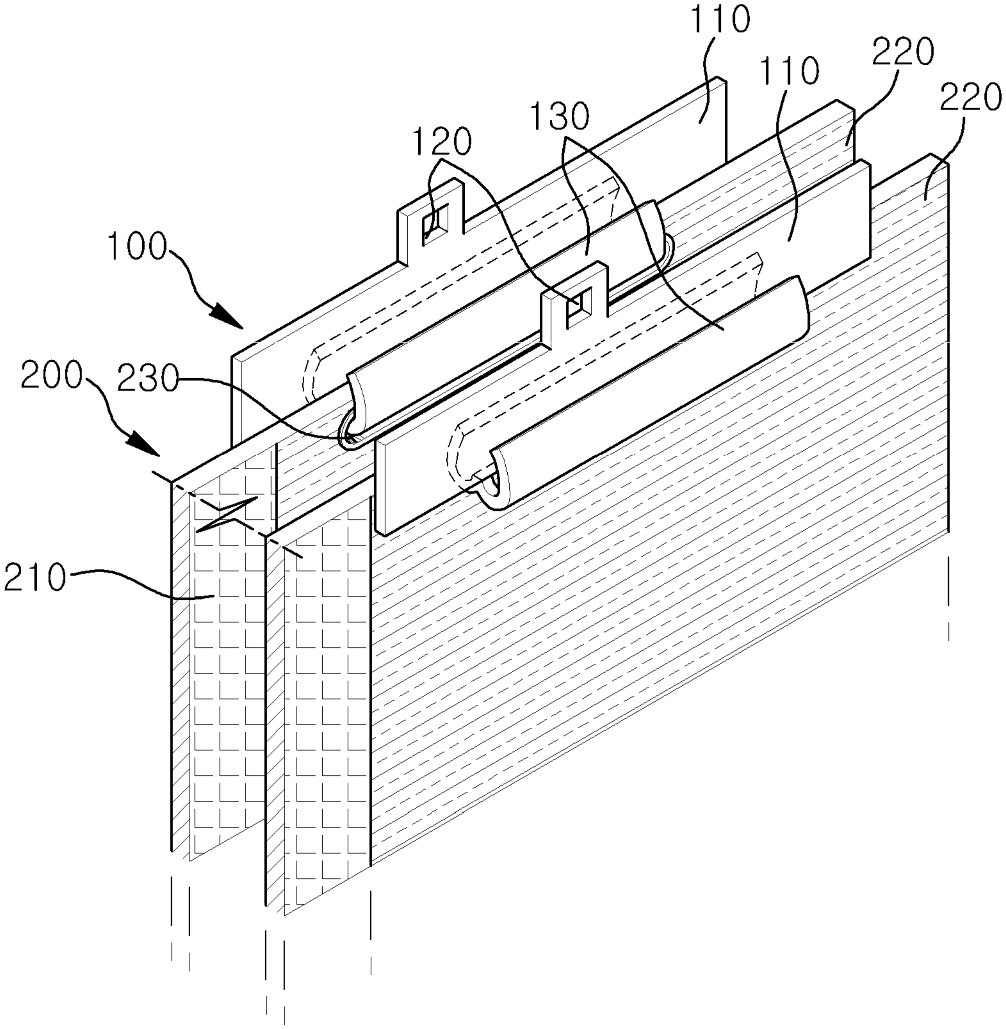
FIG. 10 is a second state diagram illustrating the state of the use of the connecting member having a hook member for a vertical blind, and the vertical blind with a curtain function using the same according to the present disclosure.

As illustrated in FIG. 10, the connection hole 230 formed in the light blocking part 220 of the blind sheet 200 may be provided in an oval shape having a long hole. In addition, the hook member 130 disposed in the body 110 also corresponds to an oval shape having a long hole, so the long hook member 130 may be connected to the connection hole 230.

Figure 11:
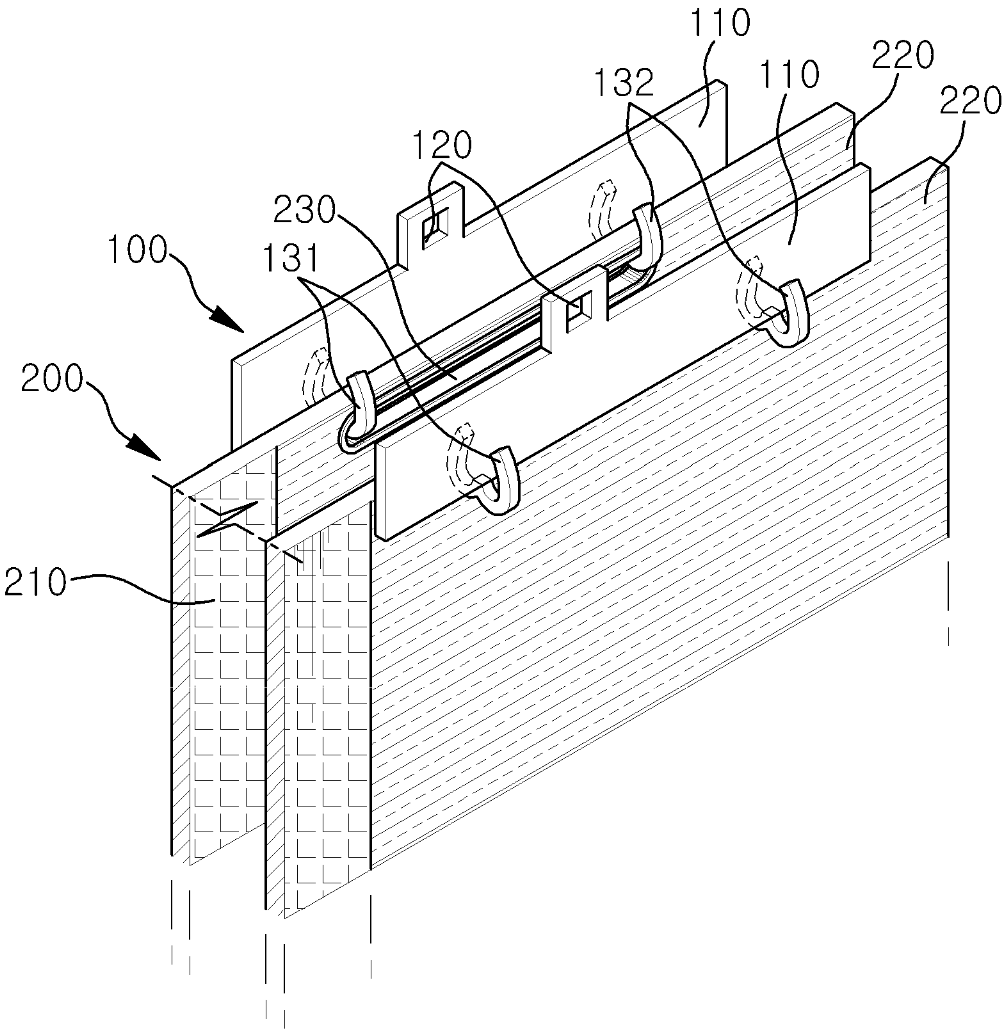
FIG. 11 is a third state diagram illustrating the state of the use of the connecting member having a hook member for a vertical blind, and the vertical blind with a curtain function using the same according to the present disclosure.

In addition, only the long hook member 130 is not required to be connected to the connection hole 230 with an oval shape having a long hole, and as illustrated in FIG. 11, a plurality of hook members 130 disposed on one side of the body 110 may be connected to the oval-shaped connection hole 230. In this case, the plurality of hook members 130 connected to the oval-shaped connection hole 230 can support the weight of the blind sheet 200 and maintain balance thereof so that the blind sheet does not tilt to one side.

Figure 12:
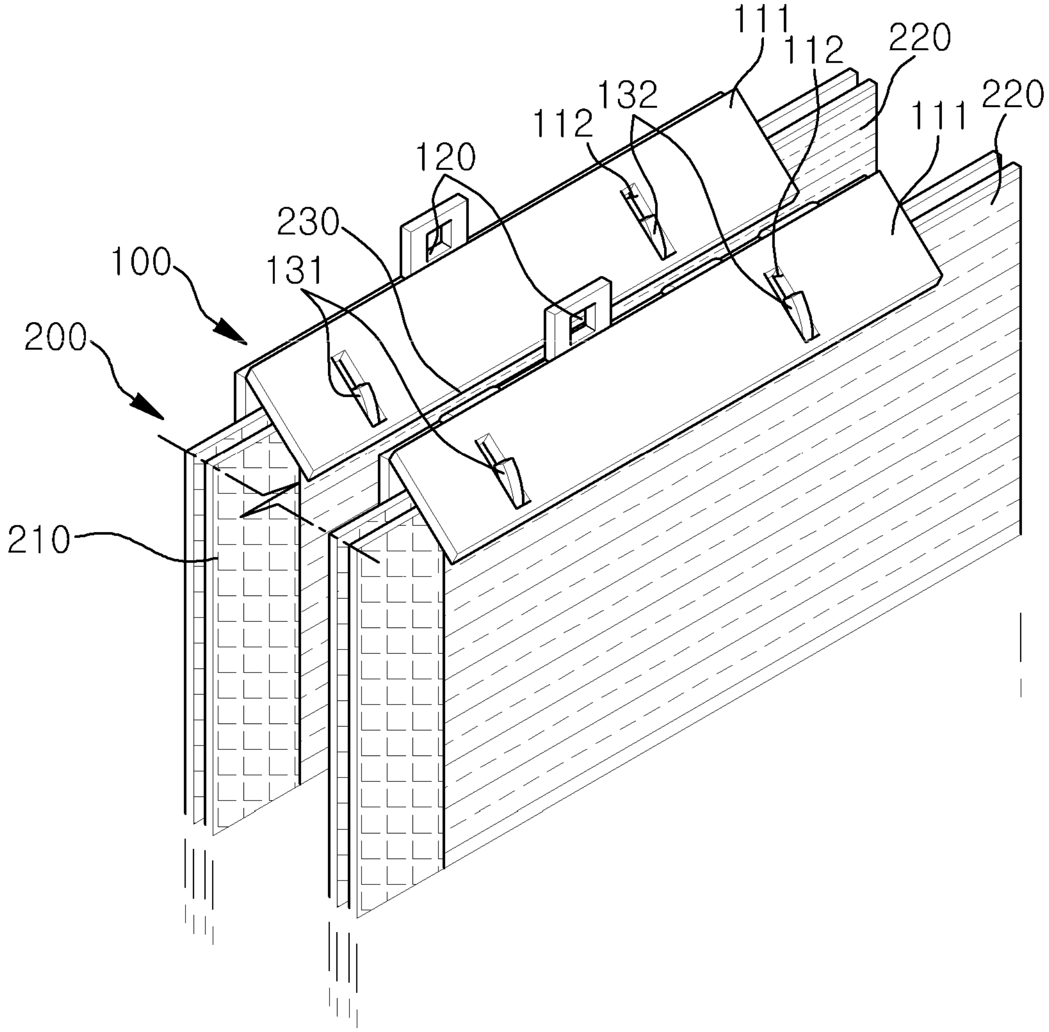
FIG. 12 is a fourth state diagram illustrating the state of the use of the connecting member having a hook member for a vertical blind, and the vertical blind with a curtain function using the same according to the present disclosure.

In addition, as illustrated in FIG. 12, the blind sheet may be connected to the connecting member to which the fixing cover 111 is attached. The shape of the hook member 130 provided on the body 110 is diverse, and according to the various shapes of the hook members 130, the opening 112 of the fixing cover 111 may also be formed in various shapes. As illustrated in FIG. 12, a fixing cover 111 having an opening 112 of a thin shape may be provided to correspond to a thin hook member 130, and although all of other fixing covers 111 are not shown, a connecting member to which the fixing cover 111 having the openings 112 of various shapes for various hook members illustrated in this specification is attached may be applied. In addition, as illustrated in FIG. 12, the hook member 130 of the connecting member having the fixing cover 111 may hold two blind sheets, and this can be equally applied to the connecting member 130 provided with the fixing cover 111 described below.

Figure 13A:
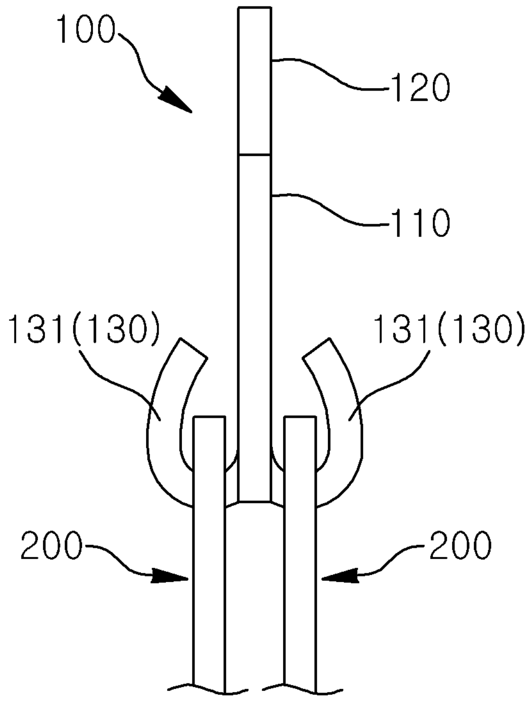
FIG. 13(*a*) is a first side view of the connecting member and the blind sheet according to the present disclosure.
Figure 13B:
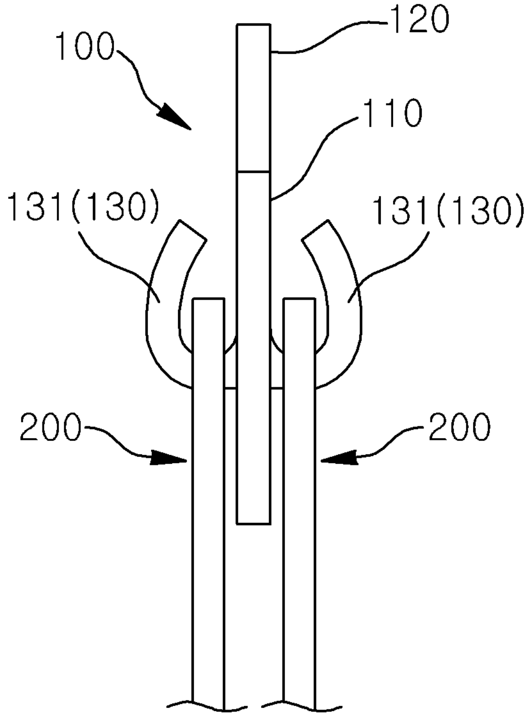

FIG. 13(*a*) is a first side view of the connecting member and the blind sheet according to the present disclosure, and FIG. 13(*b*) is a second side view of the connecting member and the blind sheet. Referring to FIGS. 13(*a*) and 13(*b*), a predetermined gap is formed between the end of the hook member 130 and the body 110 so that the blind sheet 200 can be easily held by or removed from the hook member 130.

As illustrated in FIG. 13(*a*), the hook member 130 disposed on the first side surface or each of the opposite side surfaces of the body 110 may protrude from the lower portion of the body 110. In addition, like the lower end of the hook member 130 of FIG. 13(*a*), the hook member may have a lower end having a curved shape, and like the lower end of the hook member 130 of FIG. 13(*b*), the hook member may have a lower end protruding in a flat shape from the body 110.

As illustrated in FIG. 13(*b*), the hook member 130 disposed on one side surface or each of opposite side surfaces of the body 110 may protrude from the middle part of the body 110. That is, in the above case, the hook member 130, which has a general hook shape, may protrude at a position closer to the attachment tool 120, and accordingly, the blind sheet 200 may be held higher from the ground. In addition, like the lower end of the hook member of FIG. 13(*b*), the hook member may have a lower end having a flat shape, and like the lower end of the hook member 130 of FIG. 13(*a*), the hook member may have a lower end protruding in a curved shape from the body 110.

Figure 14A:
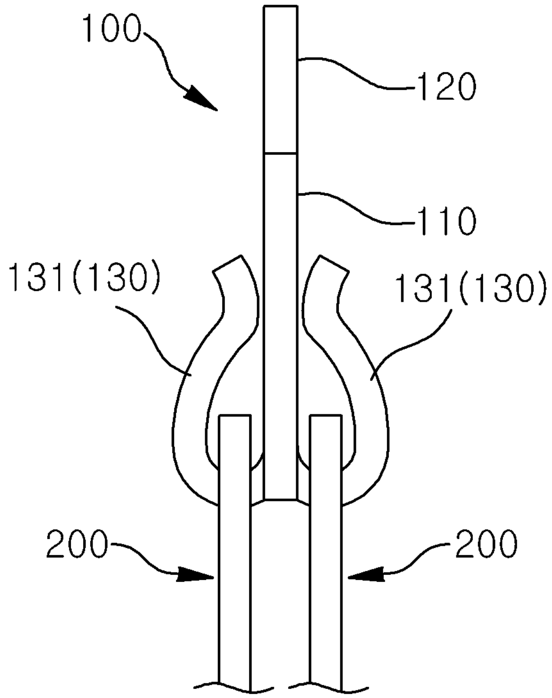
FIG. 14(*a*) is a third side view of the connecting member and the blind sheet according to the present disclosure.
Figure 14B:
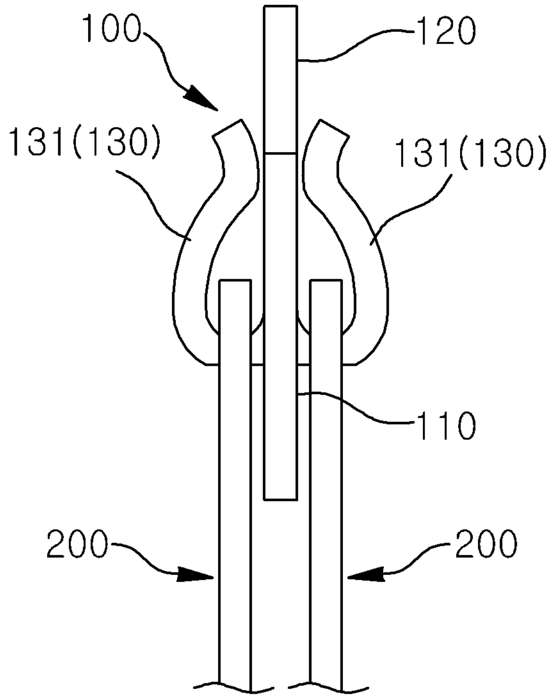

FIG. 14(*a*) is a third side view of the connecting member and the blind sheet according to the present disclosure, and FIG. 14(*b*) is a fourth side view of the connecting member and the blind sheet. The shape of the cross section of the hook member 130 may be similar to an 'S' shape, and this is intended to prevent the removal of the blind sheet 200 held by the hook member 130. The hook member 130 may be formed by having a shape memory material inserted therein, and the end of the hook member 130 and the body 110 may be in contact with each other. In addition, like the hook member 130 of FIG. 14(*a*), the hook member may have a lower end having a curved shape, and like the lower end of the hook member 130 of FIG. 14(*b*), the hook member may have a lower end protruding in a flat shape from the body 110.

FIG. 14(*b*) is a fourth side view of the connecting member and the blind sheet according to the present disclosure, and as illustrated in the drawing, the hook member 130 disposed on one side surface or each of opposite side surfaces of the body 110 may protrude from the middle part of the body 110. That is, in the above case, the shape of the hook member 130 is a general hook shape, and the hook member 130 may protrude from a position closer to the attachment tool 120, and thus the blind sheet 200 may be held at a position higher from the ground. Furthermore, as for an 'S' shaped hook member 130 illustrated in FIGS. 14(*a*) and 14(*b*), the upper end of the hook member 130 is preferably formed so as not to collide with the runner 11 coupled to the attachment tool 120. In addition, like the lower end of the hook member in FIG. 14(*b*), the lower end of the hook member may be formed in a flat shape, and like the lower end of the hook member 130 in FIG. 14(*a*), the lower end of the hook member 130 may protrude from the body 110 by having a curved shape.

Figure 15A:
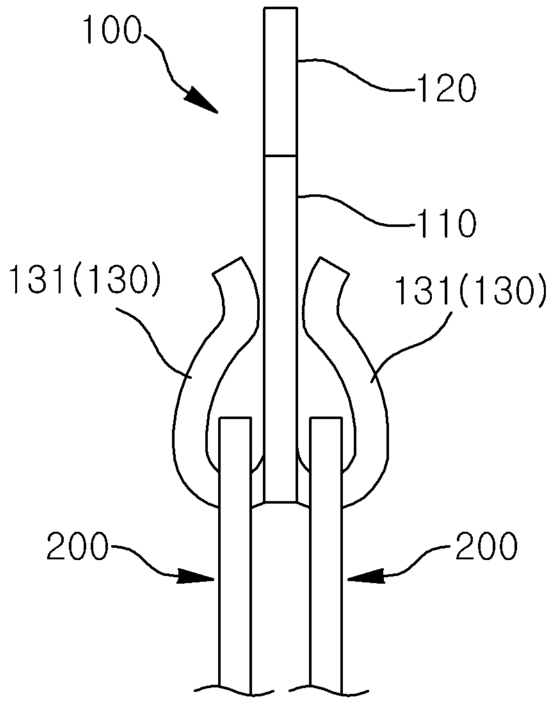
FIG. 15(*a*) is the third side view of the connecting member sheet according to the present disclosure and the blind illustrated in FIG. 14(*a*), and is illustrated to compare with FIG. 15(*b*).
Figure 15B:
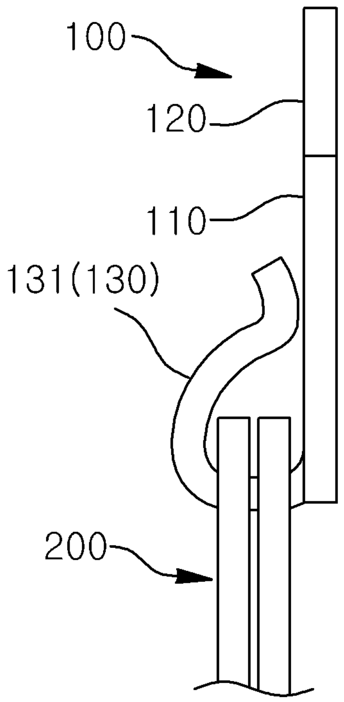

FIG. 15(*b*) is a fifth side view of the connecting member and the blind sheet, and the blind sheet 200 connected to the hook member 130 is not required to be one blind sheet, but as illustrated in FIG. 15(*b*), two blind sheets 200 may be connected to one hook member 130. Accordingly, even when a plurality of blind sheets 200 is connected to the hook member, the hook member 130 may be configured to have strength to stably support weight thereof. In addition, although not shown in the drawing, even when a plurality of blind sheets 200 is connected to one hook member 130, the hook member 130 is not required to protrude from the lower part of the body 110, and the hook member 130 may protrude from the middle part of the body 110.

FIG. 15(*a*) is the third side view of the connecting member and the blind sheet and is illustrated to compare with the fifth side view.

Figure 16:
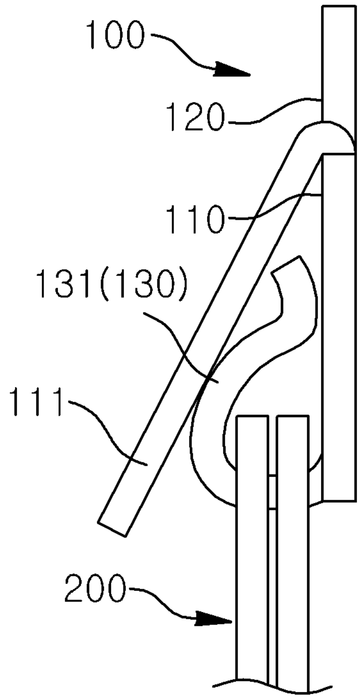
FIG. 16 is a sixth side view of the connecting member and the blind sheet according to the present disclosure.

FIG. 16 is the sixth side view of the connecting member and the blind sheet according to the present disclosure. The shape of the hook member 130 of the sixth side view is similar to an 'S' shape in cross section, and this is to prevent the blind sheet 200 from being removed therefrom. The fixing cover 111 may have the same area as the body 110 so as to lie correspondingly on the body 110, and may include an opening 112 larger than the hook member 130 in order not to interfere with the hook member 130 when the fixing cover 111 is closed. In FIG. 8(*b*), the opening 112 is illustrated in a quadrangular shape, but is not necessarily limited to this shape, and may be an opening 112 of any shape when the opening does not interfere with the hook member 130. The fixing cover 111 can prevent the blind sheet fastened into the hook member 130 from being removed therefrom, and may not be completely in close contact with the body 110 due to the volume of the blind sheet. In addition, as in the sixth side 10 view, a plurality of blind sheets 200 may be held by the hook member 130 of the connecting member 100 provided with the fixing cover 111.

Figure 17A:
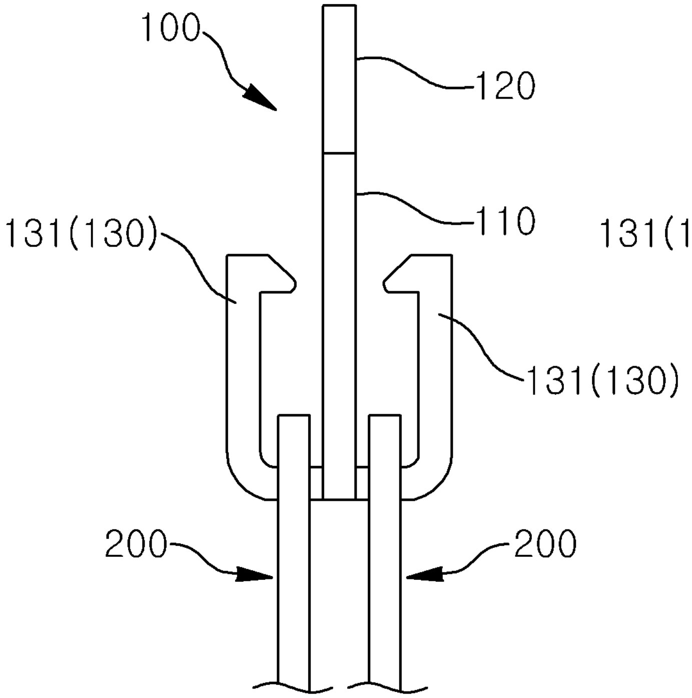
FIG. 17(*a*) is a seventh side view of the connecting member and the blind sheet according to the present disclosure.
Figure 17B:
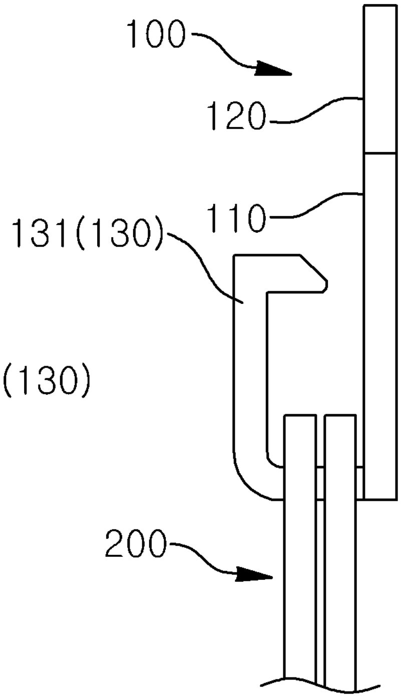

FIG. 17(*a*) is the seventh side view of the connecting member and the blind sheet according to the present disclosure. As illustrated in the seventh side view, the hook member 130 may be formed in a structure with an 'L'-shaped cross section, and one surface of the upper end of the hook member 130 may have a tapered structure. This is intended to make the structure of the hook member 130 similar to a 'fish hook' so that the connection hole 230 of the blind sheet can be easily connected to the hook member 130 and be difficult to be removed therefrom.

In addition, as in the eighth side view of the connecting member and the blind sheet illustrated in FIG. 17(*b*), a plurality of blind sheets 200 may be held by one hook member 130. Even in this case, the hook member 130 may have sufficient strength to support the weight of the plurality of blind sheets 200. In the eight side view, the length of the end of the hook member 130 may be varied, and the tapered structure of the end of the hook member 130 is not necessarily limited to a specific shape.

Furthermore, although not shown in FIGS. 17(*a*) and 17(*b*), even when a plurality of blind sheets 200 is connected to one hook member 130, the hook member 130 is not required to protrude from the lower part of the body 110, and the hook member 130 may protrude from the middle part of the body 110.

Figure 18A:
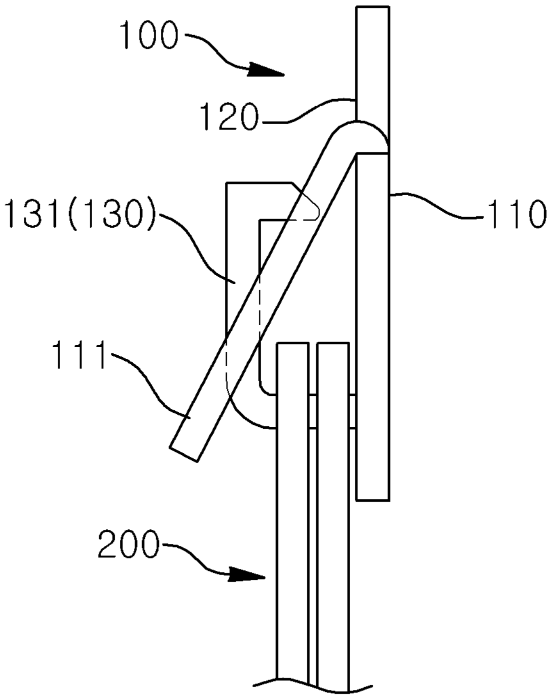
FIG. 18(*a*) is a ninth side view of the connecting member and the blind sheet according to the present disclosure.
Figure 18B:
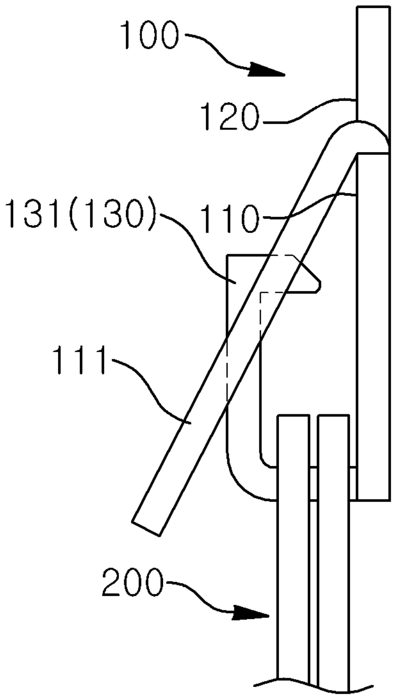

FIG. 18(*a*) is a ninth side view of the connecting member and the blind sheet according to the present disclosure, and FIG. 18(*b*) is a tenth side view of the connecting member and the blind sheet according to the present disclosure. In the ninth side view and the tenth side view, as in the seventh side view, the hook member 130 may be formed to have an 'L'-shaped cross section, and one surface of the upper end of the hook member 130 may have tapered structure. The fixing cover 111 may have the same area as the body 110 so as to lie correspondingly on the body 110, and may include an opening 112 larger than the hook member 130 in order not to interfere with the hook member 130 when the fixing cover 111 is closed. In FIG. 8(*b*), the opening 112 is illustrated in a quadrangular shape, but is not necessarily limited to this shape, and may be an opening 112 of any shape when the opening does not interfere with the hook member 130. The fixing cover 111 can prevent the blind sheet fastened into the hook member 130 from being removed therefrom. In addition, as illustrated in FIG. 18(*a*), the hook member 130 may be formed from the middle part of the body 110, and as illustrated in FIG. 18(*b*), the hook member 130 may be formed from the lower end part of the body 110. Furthermore, as illustrated in FIG. 18(*b*), the fixing cover 111 may be formed to be long, compared to FIG. 18(*a*). In addition, as in the ninth side view and the tenth side view, a plurality of blind sheets 200 may be held by the hook member 130 of the connecting member 100 provided with the fixing cover 111.

Figure 19A:
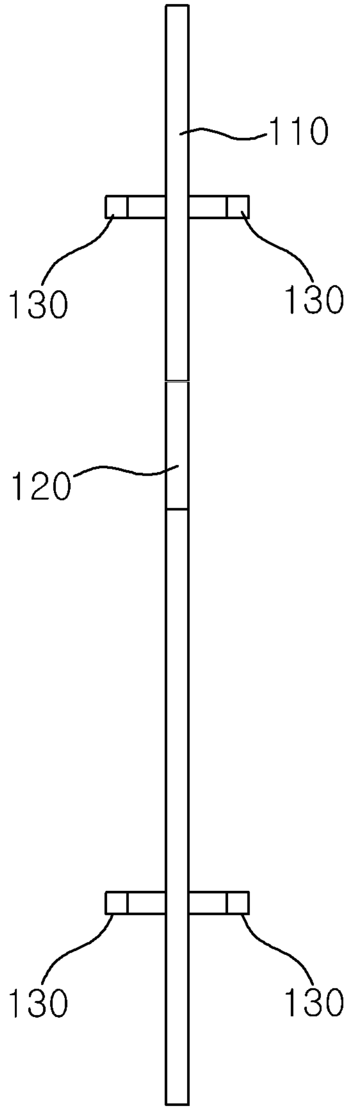
FIG. 19(*a*) is a first elevation view of the connecting member according to the present disclosure.
Figure 19B:
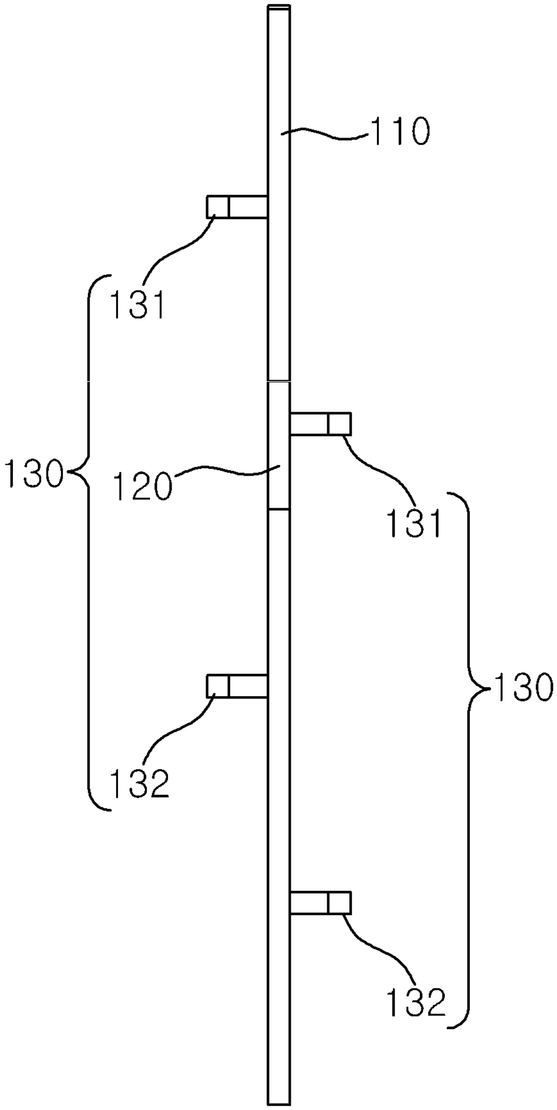

FIG. 19(*a*) is a first elevation view of the connecting member according to the present disclosure, and FIG. 19(*b*) is a second elevation view of the connecting member. As in the first elevation view, the hook members 130 disposed on the opposite side surfaces of the body 110 may be formed to be symmetrical with respect to the body 110. In addition, as in the second elevation view, the hook members 130 may be alternately formed at positions spaced by an appropriate distance apart from each other on a first side surface and a second side surface, respectively, with respect to the body 110. That is, the hook members 130 on the opposite side surfaces may be respectively arranged at positions that do not correspond to each other.

Figure 20A:
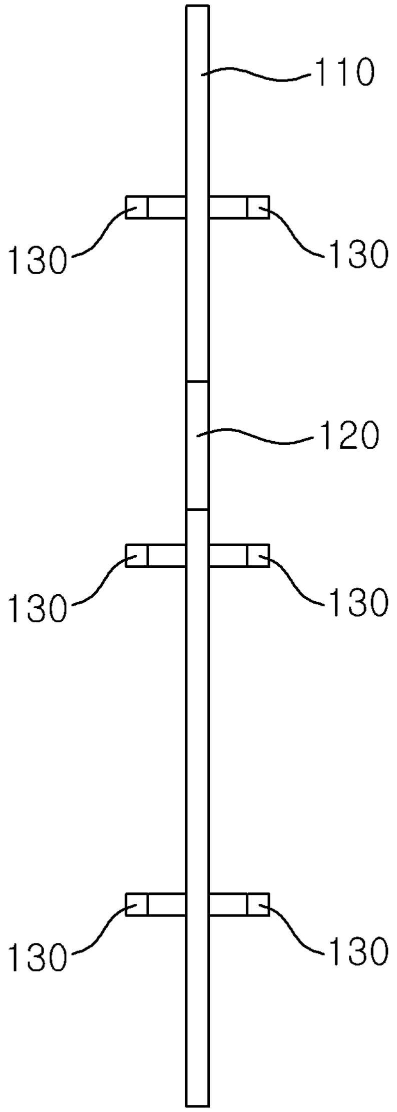
FIG. 20(*a*) is a third elevation view of the connecting member according to the present disclosure.
Figure 20B:
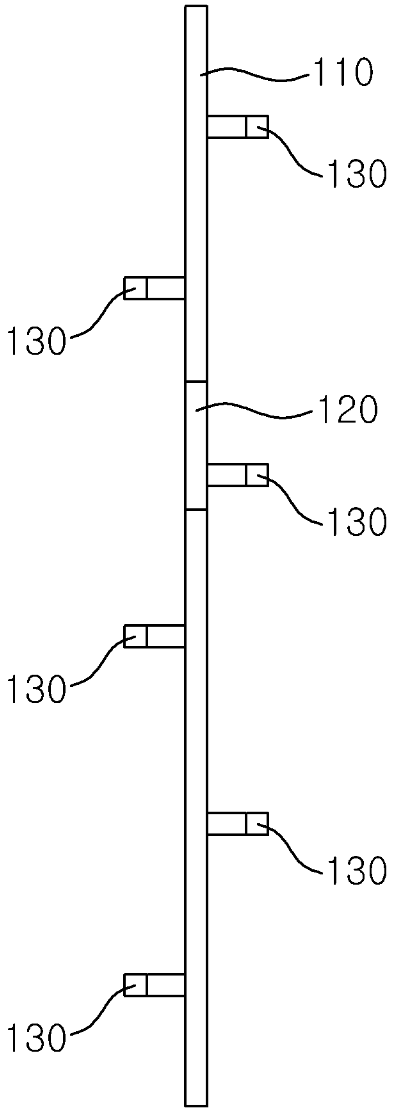

FIG. 20(*a*) is a third elevation view of the connecting member according to the present disclosure, and FIG. 20(*b*) is a fourth elevation view of the connecting member. The third elevation view shows a state in which the number of the hook members is increased in the same arrangement as the first elevation view, and the fourth elevation view shows a state in which the number of the hook members is increased in the same arrangement as the second elevation view.

Figure 21:
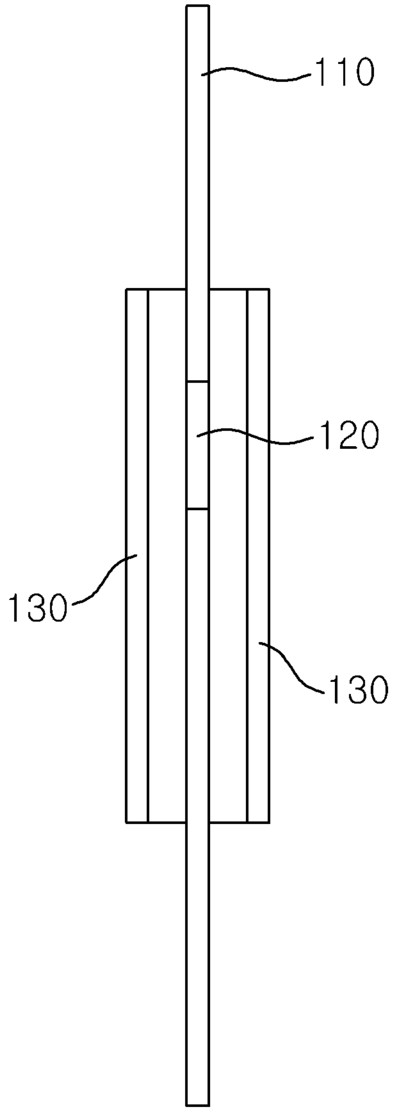
FIG. 21 is a fifth elevation view of the connecting member according to the present disclosure.
Figure 22A:
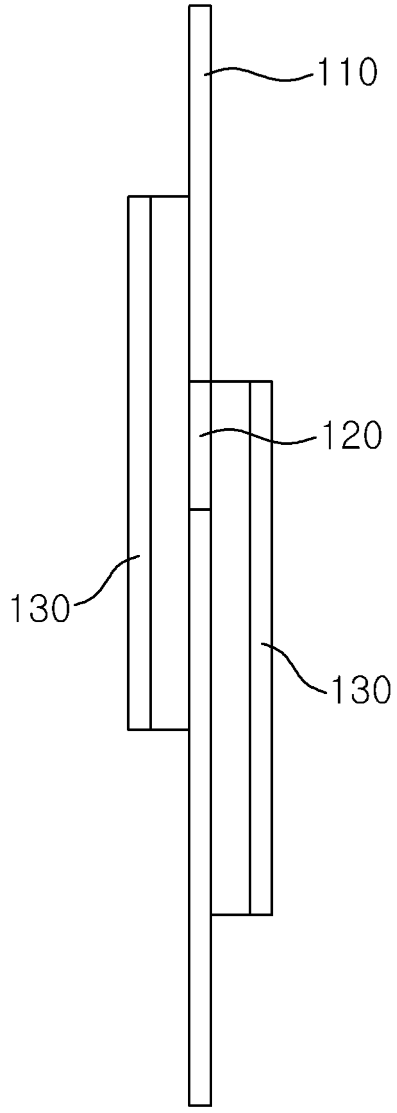
FIG. 22(*a*) is a sixth elevation view of the connecting member according to the present disclosure.
Figure 22B:
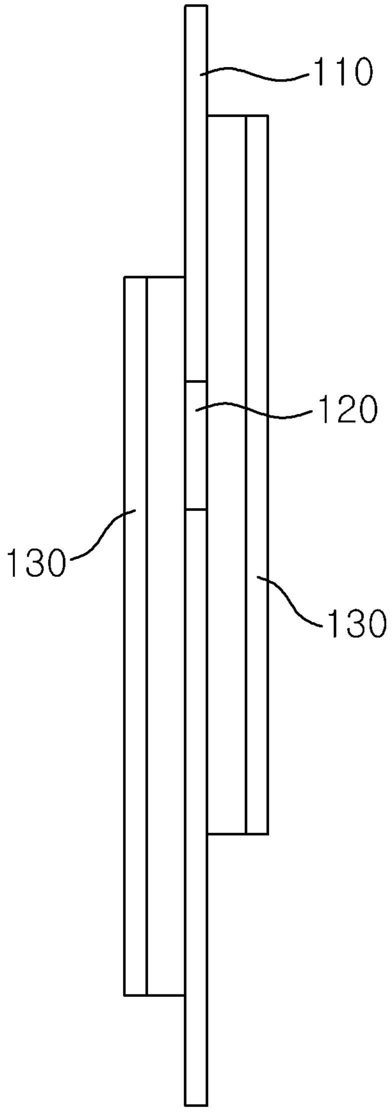

FIG. 21 is a fifth elevation view of the connecting member according to the present disclosure, FIG. 22(*a*) is a sixth elevation view of the connecting member, and FIG. 22(*b*) is a seventh elevation view of the connecting member. As in the fifth elevation view, the hook members 130 whose lengths are extended may have a symmetrical structure with respect to the body 110 when the hook members 130 are disposed on the first side surface and second side surface of the body 110, respectively. In addition, as in the sixth elevation view and the seventh elevation view, the hook members 130 whose lengths are extended may not have a symmetrical structure when he hook members 130 are disposed on the first side surface and second side surface of the body 110, respectively. The hook members 130 may be disposed in various shapes on the first side surface and second side surface of the body 110.

As described above, according to the connecting member having a hook member for a vertical blind, and the vertical blind with a curtain function using the same according to the present disclosure, the vertical blind includes the blind sheet having connection holes formed in the upper side of the light blocking part, and the connecting member having the hook member protruding on one side surface or opposite side surfaces of the body, with the hook member being held in each of the connection holes and having a hook shape, thereby simplifying the installation process of the vertical blind with a curtain function and allowing even less skilled consumers to easily install the vertical blind. In addition, simply holding the connection hole by the hook member makes the blind sheet horizontal so that the connecting member and the vertical blind of the present disclosure can be installed in an orderly fashion.

In addition, neighboring blind sheets are disposed to be held by the hook members on one side surface or opposite side surfaces of the body of the connecting member, wherein the blind sheets are connected to the connecting member in such a manner that the transparent part is bent into a semicircular arc shape and the light blocking parts face each other so that the light blocking part and the light blocking part are in close contact with each other, thereby easily implementing a light blocking function. Furthermore, there is the effect of enabling a selective light blocking function to be easily implemented by controlling the angles of the transparent parts and the light blocking parts.

Furthermore, the body is configured so that the attachment tool is disposed on a center of gravity of the body at which the body can be maintained to be horizontal while the blind sheet is held on the body, thereby allowing the body to be precisely balanced.

The connecting member 100 basically applied to the blind with a curtain function may include the attachment tool 120 coupled to each of runners 11 that are successively arranged in the inner space of the rail 10 coupled to a ceiling, the body 110 arranged on the lower side of the attachment tool 120, and the hook member 130 formed on the body 110 by protruding therefrom and having a hook shape.

In addition, according to another embodiment of the present disclosure, the attachment tool 120 of the connecting member 100 applied to the blind with a curtain function may be disposed on the center of gravity of the body 110 at which the body can be maintained to be horizontal while a blind sheet is held on the body 110.

Additionally, according to another embodiment of the present disclosure, the hook member 130 of the connecting member 100 applied to the blind with a curtain function may be formed on each of opposite sides of the body or on one side thereof, and one surface of the end of the hook member may be formed in a tapered structure.

In addition, according to another embodiment of the present disclosure, the body 110 of the connecting member 100 applied to the blind with a curtain function may be provided with the fixing cover 111 having an upper end connected to one side surface thereof, wherein the fixing cover 111 may include the opening 112 through which the hook member 130 can pass.

Accordingly, the blind with a curtain function may include the connecting member 100 of each of the various embodiments mentioned above, and the blind sheet 200 mounted on the connecting member 100 and having the light blocking parts 220 disposed respectively on the opposite sides of the transparent part 210.

In the above, the present disclosure has been described by using various embodiments but is not limited thereto, and it is natural that anything that can be reasonably interpreted from the scope of the claims of the present disclosure falls within the scope of the claims of the present disclosure.

In addition, terms and words used in this specification and claims should not be construed as limited to their common or dictionary meanings, and should be interpreted as meanings and concepts consistent with the technical idea of the present disclosure on the basis of the principle that the present inventor can appropriately define the concepts of the terms in order to explain the present disclosure in the best way.

Accordingly, the configuration shown in the drawings and embodiments described in this specification is only one of the most preferred embodiments of the present disclosure, and does not represent the entire technical idea of the present disclosure, so at the time of filing this application, it should be understood that equivalents and variations that can replace the embodiment may exist.

DESCRIPTION OF THE REFERENCE NUMERALS IN THE DRAWINGS

| | |
|---|---|
| 1: Vertical blind with curtain function | 10: Rail |
| 11: Runner | 100: Connecting member |
| 110: Body | 111: Fixing cover |
| 112: Opening | 120: Attachment tool |
| 130: Hook member | 131: First hook |
| 132: Second hook | 200: Blind sheet |
| 210: Transparent part | 220: Light blocking part |
| 230: Connection hole | 231: First connection hole |
| 232: Second connection hole | 240: Eyelet |

INDUSTRIAL APPLICABILITY

In the connecting member according to the present disclosure, the light blocking part and the light blocking part of the blind sheet held by the hook members on the opposite side surfaces or one side surface of the body are in close contact with each other, thereby easily implementing an excellent light blocking function, and the attachment tool of the body is disposed on the center of gravity at which the body can be maintained to be horizontal while the blind sheet is held on the body, thereby preventing the marketability of the blind sheet from declining. In addition, just by the connecting the connection holes of the blind sheet to the hook members, the blind sheet can be horizontal, and the connecting member and the blind sheet can be installed in an orderly fashion, and accordingly, the installation process of the blind sheet is simplified and a less-skilled consumer can easily install the blind sheet, so the connecting member has industrial applicability in industries related to a connecting member for a vertical blind and a vertical blind with a curtain function.

The invention claimed is:

1. A connecting member comprising:

an attachment tool;

a body arranged on a lower side of the attachment tool; and a hook member formed on the body by protruding therefrom and having a hook shape and configured to hold a blind sheet, wherein the blind sheet comprises:

a transparent part disposed at a center side and light blocking parts disposed on both sides of the transparent part;

the transparent part being bent into a semicircular arc such that the light blocking parts face each other and are hung on the hook member; and a distance (d1) from a position at which the attachment tool is disposed to one end of the body directed to the center side of the blind sheet is shorter than a distance (d2) from a position at which the attachment tool is disposed to an opposite end of the body, and wherein the body is provided with a fixing cover having an upper end connected to one side surface thereof, and wherein the fixing cover comprises an opening configured to penetrate the fixing cover and receive the hook member.

2. The connecting member of claim 1, wherein the attachment tool is disposed on a center of gravity of the body at which the body is capable of being maintained to be horizontal while the blind sheet is held on the body.

3. The connecting member of claim 1, wherein at least two hook members protrude on each of opposite sides of the body or on one side thereof.

4. The connecting member of claim 1, wherein the hook member has a tapered structure at an end of the hook member.

5. A vertical blind with a curtain function, the vertical blind comprising:

a connecting member comprising an attachment tool, a body arranged on a lower side of the attachment tool, and a hook member formed on the body by protruding therefrom and having a hook shape; and a blind sheet mounted to the connecting member and having a transparent part and light blocking parts disposed respectively on opposite sides of the transparent part, wherein the blind sheet comprises:

the transparent part disposed at a center side and the light blocking parts disposed on both sides of the transparent part;

the transparent part being bent into a semicircular arc such that the light blocking parts face each other and are hung on the hook member; and a distance (d1) from a position at which the attachment tool is disposed to one end of the body directed to the center side of the blind sheet is shorter than a distance (d2) from a position at which the attachment tool is disposed to an opposite end of the body, and wherein the body is provided with a fixing cover having an upper end connected to one side surface thereof, and wherein the fixing cover comprises an opening configured to penetrate the fixing cover and receive the hook member.

6. The vertical blind of claim 5, wherein the blind sheet comprises a connection hole formed in an upper side of each of the light blocking parts.

7. The vertical blind of claim 5, wherein a film is attached on each of the light blocking parts of the blind sheet to protect an edge of a connection hole and prevent the blind sheet from being damaged by friction.

8. The vertical blind of claim 5, wherein the connecting member is configured so that a first side blind sheet is held by a hook member disposed on a first side surface of the body and a second side blind sheet neighboring to the first side blind sheet is held by a hook member disposed on a second side surface of the body.

9. The vertical blind of claim 5, wherein the hook member is formed on a first side surface of the body by protruding therefrom to have the hook shape, and is configured so that a plurality of blind sheets is held by the hook member.

10. A connecting member comprising:

an attachment tool;

a body arranged on a lower side of the attachment tool; and a hook member formed on the body by protruding therefrom and having a hook shape and configured to hold a blind sheet, wherein the blind sheet comprises:

a transparent part disposed at a center side and light blocking parts disposed on both sides of the transparent part;

the transparent part being bent into a semicircular arc such that the light blocking parts face each other and are hung on the hook member; and a distance (d1) from a position at which the attachment tool is disposed to one end of the body directed to the center side of the blind sheet is shorter than a distance (d2) from a position at which the attachment tool is disposed to an opposite end of the body, and wherein a shape of a cross section of the hook member is an S shape.

11. The connecting member of claim 10, wherein the body is provided with a fixing cover having an upper end connected to one side surface thereof, and wherein the fixing cover comprises an opening configured to penetrate the fixing cover and receive the hook member.

* * * * *